(12) United States Patent
Sheldon

(10) Patent No.: US 8,463,696 B2
(45) Date of Patent: Jun. 11, 2013

(54) SYSTEM AND METHOD FOR MANAGING EXECUTABLE FUNCTIONS WITHIN A TRADING SYSTEM

(75) Inventor: Adam Sheldon, Chicago, IL (US)

(73) Assignee: Precision Trading IP, LLC, Chicago, IL (US)

( * ) Notice: Subject to any disclaimer, the term of this patent is extended or adjusted under 35 U.S.C. 154(b) by 0 days.

(21) Appl. No.: 13/228,425

(22) Filed: Sep. 8, 2011

(65) Prior Publication Data

US 2013/0066760 A1    Mar. 14, 2013

(51) Int. Cl.
*G06Q 40/00*     (2012.01)
*G06F 3/048*     (2006.01)

(52) U.S. Cl.
USPC ................. 705/37; 705/35; 715/847

(58) Field of Classification Search
None
See application file for complete search history.

(56) References Cited

U.S. PATENT DOCUMENTS

| | | | | |
|---|---|---|---|---|
| 5,736,976 A * | 4/1998 | Cheung | | 345/168 |
| 5,990,905 A * | 11/1999 | Chew et al. | | 345/630 |
| 6,069,628 A * | 5/2000 | Farry et al. | | 715/835 |
| 6,081,901 A * | 6/2000 | Dewa et al. | | 713/300 |
| 6,209,034 B1 * | 3/2001 | Gladwin et al. | | 709/227 |
| 6,320,519 B1 * | 11/2001 | Hsu et al. | | 341/23 |
| 7,389,258 B2 * | 6/2008 | Brumfield et al. | | 705/35 |
| 7,400,718 B2 * | 7/2008 | Alhadad et al. | | 379/265.07 |
| 7,610,233 B1 * | 10/2009 | Leong et al. | | 705/37 |
| 7,693,780 B2 * | 4/2010 | Stearns | | 705/37 |
| 7,774,250 B1 * | 8/2010 | Foley | | 705/35 |
| 7,974,909 B1 * | 7/2011 | Tresenriter | | 705/37 |
| 8,081,090 B2 * | 12/2011 | Wu et al. | | 341/22 |
| 8,131,626 B2 * | 3/2012 | Langridge | | 705/37 |
| 2001/0003179 A1 * | 6/2001 | Martyn et al. | | 705/37 |
| 2001/0003816 A1 * | 6/2001 | Kimmo et al. | | 707/1 |
| 2002/0152131 A1 * | 10/2002 | Lee | | 705/26 |
| 2002/0194115 A1 * | 12/2002 | Nordlicht et al. | | 705/37 |
| 2003/0055776 A1 * | 3/2003 | Samuelson | | 705/37 |
| 2003/0061149 A1 * | 3/2003 | Ajitsaria et al. | | 705/37 |
| 2003/0101129 A1 * | 5/2003 | Waddell et al. | | 705/37 |
| 2003/0187761 A1 * | 10/2003 | Olsen et al. | | 705/35 |
| 2004/0263480 A1 * | 12/2004 | Pagan | | 345/172 |
| 2005/0035949 A1 * | 2/2005 | Beck et al. | | 345/168 |
| 2005/0144189 A1 * | 6/2005 | Edwards et al. | | 707/102 |
| 2005/0144567 A1 * | 6/2005 | Kurtenbach et al. | | 715/810 |
| 2005/0149428 A1 * | 7/2005 | Gooch et al. | | 705/37 |
| 2006/0075106 A1 * | 4/2006 | Hochmuth et al. | | 709/227 |
| 2006/0117271 A1 * | 6/2006 | Keim | | 715/789 |
| 2006/0129475 A1 * | 6/2006 | Badenhorst et al. | | 705/37 |
| 2006/0209035 A1 * | 9/2006 | Jenkins et al. | | 345/172 |
| 2006/0253793 A1 * | 11/2006 | Zhai et al. | | 715/773 |
| 2007/0057921 A1 * | 3/2007 | Jenkins et al. | | 345/172 |

(Continued)

Primary Examiner — Gregory Johnson
(74) Attorney, Agent, or Firm — Richards Patent Law P.C.

(57) ABSTRACT

A trading system includes: a first set of two or more functions and a second set of two or more functions, wherein each of the functions in the first set and the second set includes a variable that is of a common variable type, wherein the value of the variable that is of the common variable type in the first set of functions and the value of the variable that is of the common variable type in the second set of functions may be different at a given point in time; and a function editing mechanism through which the value of the variable that is of the common variable type in the first set of functions may be edited for each of the functions in the first set of functions without affecting the value of the variable that is of the common variable type in the second set of functions.

20 Claims, 23 Drawing Sheets

U.S. PATENT DOCUMENTS

| | | |
|---|---|---|
| 2007/0100471 A1* | 5/2007 | Kumar et al. .................. 700/18 |
| 2007/0162875 A1* | 7/2007 | Paquette et al. ............... 715/847 |
| 2007/0208654 A1* | 9/2007 | Stearns .......................... 705/37 |
| 2007/0219893 A1* | 9/2007 | Xu ............................. 705/36 R |
| 2007/0277089 A1* | 11/2007 | Kimmo et al. ............. 715/501.1 |
| 2008/0015970 A1* | 1/2008 | Brookfield et al. ............. 705/37 |
| 2008/0074294 A1* | 3/2008 | Lin et al. ......................... 341/26 |
| 2008/0275808 A1* | 11/2008 | Mackay .......................... 705/37 |
| 2009/0019390 A1* | 1/2009 | Su ................................. 715/810 |
| 2009/0106558 A1* | 4/2009 | Delgrosso et al. ............ 713/184 |
| 2009/0192930 A1* | 7/2009 | Breitenbach .................... 705/37 |
| 2009/0326917 A1* | 12/2009 | Hegenberger .................... 704/7 |
| 2010/0030678 A9* | 2/2010 | Stearns .......................... 705/37 |
| 2010/0049646 A1* | 2/2010 | Pechenik et al. ................ 705/37 |
| 2010/0050128 A1* | 2/2010 | Chiang et al. ................. 715/847 |
| 2010/0114752 A1* | 5/2010 | Downs et al. ................... 705/37 |
| 2010/0287569 A1* | 11/2010 | Chen ............................ 719/324 |
| 2010/0306706 A1* | 12/2010 | Gill et al. ...................... 715/839 |
| 2011/0066532 A1* | 3/2011 | Schonberg et al. ............ 705/35 |

* cited by examiner

| Contract to which to apply Triggers to Functions: | (select) ⌄ |
|---|---|
| 126 | Hotkey Assignments, Mouse-Action Assignments, or other User-Triggered Action assignments |

| | |
|---|---|
| Buy Order - Buy Join ⌄ | |
| Buy Order - Buy Improve ⌄ | |
| Buy Order - Buy Market ⌄ | |
| (select) ⌄ | |
| | |
| Sell Order - Sell Join ⌄ | |
| Sell Order - Sell Improve ⌄ | |
| Sell Order - Sell Market ⌄ | |
| (select) ⌄ | |
| | |
| Change Condition 1 of All Orders (e.g. Day Order or Good Til Cancelled) ⌄ | |
| Change Condition 2 of All Orders (e.g. Icebergs On or Off) ⌄ | |
| Change Condition 3 of All Orders (e.g. Exchange Order Routed to) ⌄ | |
| (select) ⌄ | |
| | |
| Raise Price of Last Order ⌄ | |
| Lower Price of Last Order ⌄ | |
| Raise Quantity of Last Order ⌄ | |
| Lower Quantity of Last Order ⌄ | |
| (select) ⌄ | |
| | |
| Cancel Last Order ⌄ | |
| Cancel All Buy Orders ⌄ | |
| Cancel All Sell Orders ⌄ | |
| Cancel All Sell Orders ⌄ | |
| (select) ⌄ | |
| | |
| Macro 1 (any multiple-step function) ⌄ | |
| Macro 2 (any multiple-step function) ⌄ | |
| Macro 3 (any multiple-step function) ⌄ | |
| Macro 4 (any multiple-step function) ⌄ | |
| (select) ⌄ | |

ETC | SAVE these Hotkey Assignments or other Assignments to Contract

FIG. 2D

When to Execute Functions?

○ Only Execute when a Particular Window or Particular Type of Window is Active (usually Platform-Specific)
○ Execute when any window in the application is active
○ Execute all the time, regardless of application state Conditions of Set of Functions which may Dynamically Change ☐ Allow Volume Condition of Orders to be Dynamically Changed
☐ Allow Exchange Condition of Orders to be Dynamically Changed
☐ Allow Offsets of Orders to be Dynamically Changed
☐ (Other)

Toggle Execution of Functions

128

☐ Turn on Hotkey Execution
☐ Turn on Mouse-Action Triggers
☐ Turn on Other Triggers Allow Contract Assignments to be Temporarily Locked?

☐ Yes, Allow Lock to be Toggled On/Off within the Particular Window which (may) correspond to Contract, e.g. "Contract 1"
☐ Temporarily Lock Contract now

[ Cancel ]    [ Ok ]

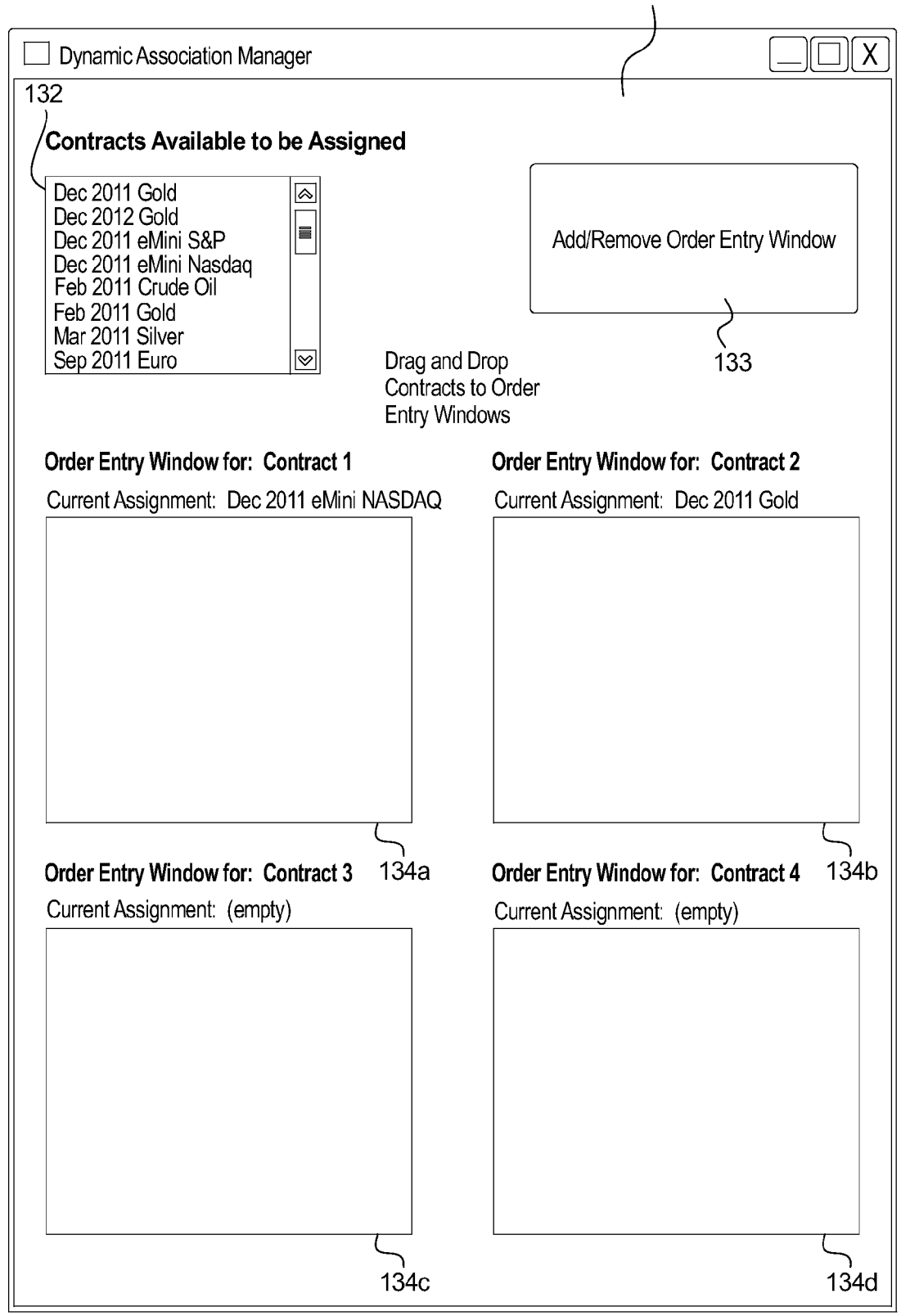

FIG. 15B

| 248 | WORKSPACE : [testing] ~252 | |
|---|---|---|
| Parent Macros | | |
| Parent Name | 260 | Relation Level |
| PORTFOLIO - Target (+++) | | Parent |
| S&P_JUN * Add, Reverse To PRE-DEFINED Target (+++) (Join) | | Parent |
| PORTFOLIO * Add, Reverse To PRE-DEFINED Target (+++) (Join) - SIMULTANEOUS Orders | | Grandparent |

FIG. 15C

| 250 | Macro File : [testing] ~254 |
|---|---|
| Parent Name | Relation Level |
| 260 | |

FIG. 15D

| Sort Macros | Macro ☐ 1 ⇵ ASC | Execution Approach ☐ 2 ⇵ ASC | Export Macros |
|---|---|---|---|
| Export | Macro Name | | Execution Approach |
| ☑ | S&P_JUN - Target (-) | | Safety_MEDIUM |
| ☑ | S&P_JUN - Target (--) | 148a | Safety_MEDIUM |
| ☑ | S&P_JUN - Target (+) | | Safety_MEDIUM |
| ☑ | S&P_JUN - Target (+++) | | Safety_MEDIUM |
| ☐ | S&P_JUN * Add, Reverse To CURRENT Target (Join) | | Safety_MEDIUM |
| ☐ | S&P_JUN * Add, Reverse To PRE_DEFINED Target (-) (Join) | | Safety_MEDIUM |
| ☐ | S&P_JUN * Add, Reverse To PRE_DEFINED Target (--) (Join) | | Safety_MEDIUM |
| ☐ | S&P_JUN * Add, Reverse To PRE_DEFINED Target (+) (Join) | | Safety_MEDIUM |
| ☐ | S&P_JUN * Add, Reverse To PRE_DEFINED Target (+++) (Join) | | Safety_MEDIUM |
| ☐ | S&P_JUN * Liquidate Position (Join) | | Safety_MEDIUM |
| ☐ | S&P_JUN * Liquidate To CURRENT Target (Join) | | Safety_MEDIUM |
| ☐ | S&P_JUN * Reverse Position (Join) | | Safety_MEDIUM |
| ☐ | S&P_SEP - Buy Improve - MAX | | Safety_MEDIUM |
| ☐ | S&P_SEP - Buy Improve - MAX (ICE) | 148 | Safety_MEDIUM |
| ☐ | S&P_SEP - Buy Improve - POSITION | | Safety_MEDIUM |
| ☐ | S&P_SEP - Buy Improve - POSITION (ICE) | | Safety_MEDIUM |
| ☐ | S&P_SEP - Buy Improve - POSITION TO TARGET | | Safety_MEDIUM |
| ☐ | S&P_SEP - Buy Improve - POSITION TO TARGET (ICE) | | Safety_MEDIUM |
| ☐ | S&P_SEP - Buy Join - MAX | | Safety_MEDIUM |
| ☐ | S&P_SEP - Buy Join - MAX (ICE) | | Safety_MEDIUM |
| ☐ | S&P_SEP - Buy Join - POSITION | | Safety_MEDIUM |
| ☐ | S&P_SEP - Buy Join - POSITION (ICE) | | Safety_MEDIUM |
| ☐ | S&P_SEP - Buy Join - POSITION TO TARGET | | Safety_MEDIUM |
| ☐ | S&P_SEP - Buy Join - POSITION TO TARGET (ICE) | | Safety_MEDIUM |
| ☐ | S&P_SEP - Buy Join Offset (A) - MAX | | Safety_MEDIUM |
| ☐ | S&P_SEP - Buy Join Offset (A) - MAX (ICE) | | Safety_MEDIUM |
| ☐ | S&P_SEP - Buy Join Offset (A) - POSITION | | Safety_MEDIUM |

| Rename | Rename All | Delete Highlighted |

FIG. 15E

| Sort Macros | Macro ☐ 1 ⇳ ASC | Execution Approach ☐ 2 ⇳ ASC | Import Macros |
|---|---|---|---|
| Import | Macro Name | | Execution Approach |
| ☐ | S&P_JUN - Sell Join Offset (F) - MAX | | Safety_MEDIUM |
| ☐ | S&P_JUN - Sell Join Offset (F) - MAX (ICE) | | Safety_MEDIUM |
| ☐ | S&P_JUN - Sell Join Offset (F) - POSITION | | Safety_MEDIUM |
| ☐ | S&P_JUN - Sell Join Offset (F) - POSITION (ICE) | | Safety_MEDIUM |
| ☐ | S&P_JUN - Sell Join Offset (F) - POSITION TO TARGET | | Safety_MEDIUM |
| ☐ | S&P_JUN - Sell Join Offset (F) - POSITION TO TARGET (ICE) | | Safety_MEDIUM |
| ☐ | S&P_JUN - Sell Market - MAX | | Safety_MEDIUM |
| ☐ | S&P_JUN - Sell Market - POSITION | 148 | Safety_MEDIUM |
| ☐ | S&P_JUN - Sell Market - POSITION TO TARGET   148b | | Safety_MEDIUM |
| ☐ | S&P_JUN - Sell Take - MAX | | Safety_MEDIUM |
| ☐ | S&P_JUN - Sell Take - MAX (ICE) | | Safety_MEDIUM |
| ☐ | S&P_JUN - Sell Take - POSITION | | Safety_MEDIUM |
| ☐ | S&P_JUN - Sell Take - POSITION (ICE) | | Safety_MEDIUM |
| ☐ | S&P_JUN - Sell Take - POSITION TO TARGET | | Safety_MEDIUM |
| ☐ | S&P_JUN - Sell Take - POSITION TO TARGET (ICE) | | Safety_MEDIUM |

| Rename | Rename All | Delete Highlighted |

FIG. 15F

Contained Functions and Child Macros

⊟ S&P_JUN - Target (+++) ------> [Safety_MEDIUM]
   ├ ES JUN11-Raise Target Position
   ├ ES JUN11-Raise Target Position
   ├ ES JUN11-Raise Target Position    256
   ├ ES JUN11-Raise Target Position
   ├ ES JUN11-Raise Target Position
   └ ES JUN11-Raise Target Position

Contracts Referenced by Macros

ES JUN11
YM JUN11
YM SEP11
NQ JUN11    258
NQ SEP11
ES SEP11

---> Replace all references to this Contract in all Macros with Contract selected below    >    264

Contracts contained in Workspace:

ES JUN11
YM JUN11
YM SEP11
NQ JUN11    262
NQ SEP11
ES SEP11

FIG. 15G

⊟ S&P_JUN - Sell Market - MAX ------> [Safety_MEDIUM]
   ├ ES JUN11-Next Volume : Max Sell
   └ ES JUN11-Sell Market
                            256

ES JUN11

258

---> Replace all references to this Contract in all Macros with Contract selected below    >    264

262               Remove Contract From Workspace

SYSTEM AND METHOD FOR MANAGING EXECUTABLE FUNCTIONS WITHIN A TRADING SYSTEM

BACKGROUND OF THE INVENTION

The present subject matter relates to a trading system that is configured to enable a user to manage sets of executable functions within the trading system.

Within trading systems, the term "hotkeys" typically refers to keys on the keyboard that will invoke operations (buy, sell, the route of execution, etc.) in the trading system. Hotkeys allow users to quickly execute commands, adjust order entry details and generally provide shortcuts for triggering executable functions in the trading system. Perhaps the most important benefit provided by the use of hotkeys is improved speed and accuracy in the order entry process.

Certain existing trading systems allow users to create and edit functions to be associated with hotkeys. For example, a user may create a function that directs the system to buy five contracts of a given futures contract at the market price. In some scenarios, users may wish to create large numbers of related functions to be associated with corresponding hotkeys to control numerous aspects of order entry and related processes.

Using previously existing trading systems, particularly in complex trading systems, it took a considerable amount of time to create and edit the desired functions, assign hotkeys, re-assign hotkeys, etc. For example, a user may wish to create or edit hundreds or thousands of functions depending on the complexity of the keyboard layout, the usage of certain keys, etc. This was a burdensome process when creating and editing the desired functions for a given tradable instrument, but given that some traders may further wish to change—which tradable instrument they are referencing within the functions (whether to trade a different tradable instrument entirely or to update from an expired tradable instrument (whether futures contract, options contract, etc) to a new one) the process may be orders of magnitude more burdensome. For example, if there exist functions which reference a given currency futures contract, and currency futures are entering a rollover period where market participants start to liquidate their positions on the existing front month futures contract, and proceed to roll-over their positions into the next actively traded futures contract, then the user would be required to edit all of the functions (e.g., replace all of the references to the existing futures contract with the new contract), and may further need to re-assign the associated hotkeys from the expiring futures contract to the new one (if the hotkey assignments were lost), or may instead have to delete all of the existing functions and hotkey associations and create new ones to maintain the relevance of the hotkey functionality of in the trading system. Further note that many functions may need to be created not for a particular tradable instrument but across part of or all of the user's portfolio or account, or to control other behavior in the trading system. This further confounds the problem. In more extreme situations, a user may even have to make these types of changes even more often, even daily.

Accordingly, a need exists for a trading system that enables a user to manage sets of executable functions within the trading system.

BRIEF SUMMARY OF THE INVENTION

The subject matter described herein provides systems and methods for improved management of executable functions in a trading system. The systems and methods allow users to create, edit, execute and manage one or more sets of executable functions within a trading system. The management tools provided simplify the creation of and editing of one or more sets of functions and associated hotkeys. The tools further enable a user to edits sets and subsets of hotkeys associated with functions without simultaneously effecting undesired changes in other sets and subsets of hotkeys.

Through the management tools provided herein, users may create a set of functions, edit a set of functions, edit a common variable type amongst a set of functions, etc. The functions, variables, or common variable types included within the functions may be of a wide variety, including but not limited to variables or variable types such as: tradable instruments; order quantity; exchanges; order conditions such as iceberg, all or none, good-til-cancelled, etc.; the names or titles of the functions; the hotkeys associated with the functions; as well as any other aspect of the functions or association or reference related to the functions. For readability, shorthand such as "editing functions", "editing a set of functions", and similar is occasionally used herein. It is understood that the shorthand descriptions may refer to any manner of editing (a set of) functions, including the editing of a variable or a common variable type amongst the (set of) functions.

The term "tradable instrument" or "tradable instruments" as used herein may refer to stocks, bonds, currencies, commodities, warrants, options, futures, spreads, synthetics, FOREX contracts, as well as any other type of tradable instrument. Further, the term "tradable instrument" extends to other types of tradable instruments not specifically mentioned herein, or developed in the future, as will be recognized by one of ordinary skill in the art.

The term "macro" or "macros" as used herein may refer to system-defined or user-defined executable functions within which one or more calls to other functions and/or macros may be made. In use, a macro may provide an abbreviated command structure for a user (or the system) to trigger a set of executable functions and macros.

The trading system provided herein enables a user to create and selectively edit functions simultaneously to improve the efficiency of function management and therefore the use of executable functions and related hotkeys within the trading system.

In use, a user may create, edit, and otherwise manage one or more sets of functions within the trading system. In one example, a user may develop a set of order related functions related to a gold contract and a second custom set of order related functions related to a silver contract. Since the user can employ multiple sets of functions related to separate tradable instruments within the trading system, the order entry functions for separate tradable instruments may be executed within the same trading system. Accordingly, when implementing the systems and methods described herein, it is possible for a user to trade multiple contracts (or other tradable instruments) through a single user interface. Similarly, it is possible to trade multiple tradable instruments across several order entry windows while eliminating the need for a corresponding window to be active in order to trade the intended instrument. This is particularly helpful if the user is trading numerous tradable instruments at the same time.

One example of a useful feature of the trading system provided herein is its ability to edit a selected set of functions simultaneously without affecting functions not included in the selected set of functions. This feature prevents the user from having to edit a large number of functions manually, thus saving the user much time and frustration. In one embodiment, one or more common variable types of the selected set of two or more functions may be edited at one time with a "find and replace" or "swap" command. Note if a swap is used, it is understood that multiple sets of functions are involved in the edit. The trading system provided herein further allows for multiple function variables to be edited in a single process, for example, allowing a user to select a set of functions for which the tradable instrument will be changed from a first symbol/identifier to a second symbol/identifier and the quantity used for orders will be changed from a first amount to a second amount.

The trading system provided herein allows for a user to maintain the hotkey assignments for edited functions. Thus, even after significant editing of the associated functions, a user may skip the manual re-assignment of the associated hotkeys, saving the user large amounts of time and minimizing the risk of errors caused from mis-assigned keys during a re-assignment process.

Another benefit of the trading system provided herein is its ability to create a set of functions as a group. In one example, the system may allow a user to select a set of existing functions and create a copy of those functions, and may further allow the user to substitute one or more new variable values into the newly created set of functions. For example, a user may have a large set of functions created for order entry processes related to a gold contract. The user is able to select the set of functions related to the gold contract and replicate those functions substituting a silver contract in place of the gold contract. Similarly, the user could select a set of functions related to orders for a single gold contract (buy, sell, etc.) and replicate those functions substituting an order quantity of ten into the newly created functions.

The ability to create sets of functions allows users to create a large number of functions in short time, and to do so in a way such that the results are predictable and error free. This cures the current need to manually create and replicate two or more functions, and may lessen the burden for heavy function users in trading platforms. The benefits may attract new users to the trading system, as the processes will now be much more manageable than previous systems.

In one example, a trading system includes: a first set of two or more functions and a second set of two or more functions, wherein each of the functions in the first set and the second set includes a variable that is of a common variable type, wherein the value of the variable that is of the common variable type in the first set of functions and the value of the variable that is of the common variable type in the second set of functions may be different at a given point in time; and a function editing mechanism through which the value of the variable that is of the common variable type in the first set of functions may be edited for each of the functions in the first set of functions without affecting the value of the variable that is of the common variable type in the second set of functions. Within certain embodiments of the system, the at least a first function from the first set of functions and at least a second function from the second set of functions may be executed sequentially. The sequential execution may occur without any intermediate process between a first trigger for executing the first function and a second trigger for executing the second function. In some embodiments, the first trigger and the second trigger are user-directed and may be a user-selection such as a mouse click or a key press occurring between the first trigger for executing the first function and the second trigger for executing the second function. It is understood that there are numerous examples of common variable types that may be used; tradable instrument and order quantity are merely two examples. In addition, the trading system may include a function editing mechanism that enables a user-selected set of functions to be created.

A method of managing sets of functions in a trading system includes the steps of: within a trading system, providing a first set of two or more functions and a second set of two or more functions, wherein each of the functions in the first set and the second set includes a variable that is of a common variable type, wherein the value of the variable that is of the common variable type in the first set of functions and the value of the variable that is of the common variable type in the second set of functions may be different at a given point in time; providing a function editing mechanism through which the value of the variable that is of the common variable type in the first set of functions may be edited for each of the functions in the first set of functions without affecting the value of the variable that is of the common variable type in the second set of functions; receiving a user command to edit the value of the variable that is of the common variable type in the first set of functions for each of the functions in the first set of functions without affecting the value of the variable that is of the common variable type in the second set of functions; and in response to the user command, editing the value of the variable that is of the common variable type in the first set of functions for each of the functions in the first set of functions without affecting the value of the variable that is of the common variable type in the second set of functions.

In certain embodiments, within the method at least a first function from the first set of functions and at least a second function from the second set of functions may be executed sequentially and in certain instances may be executed sequentially without any intermediate process between a first trigger for executing the first function and a second trigger for executing the second function. The triggers may be user-actions. In some embodiments, the first trigger and the second trigger are user-directed and may be a user-selection such as a mouse click or a key press. It is understood that there are numerous examples of common variable types that may be used; tradable instrument and order quantity are merely two examples. In addition, the function editing mechanism may further enable a user-selected set of functions to be created.

In another example, a trading system includes: a first set of two or more functions and a second set of two or more functions, wherein each of the functions in the first set and the second set includes a variable that is of a common variable type, wherein the value of the variable that is of the common variable type in the first set of functions and the value of the variable that is of the common variable type in the second set of functions may be different at a given point in time, and further wherein at least a first function from the first set of functions and at least a second function from the second set of functions may be executed sequentially. In certain embodiments, the at least a first function from the first set of functions and at least a second function from the second set of functions may be executed sequentially without any intermediate process between a first trigger for executing the first function and a second trigger for executing the second function. In some embodiments, the first trigger and the second trigger are user-directed and may be a user-selection such as a mouse click or a key press occurring between the first trigger for executing the first function and the second trigger for executing the second function.

The trading system may further include a function editing mechanism through which the value of the variable that is of the common variable type in the first set of functions may be edited for each of the functions in the first set of functions without affecting the value of the variable that is of the common variable type in the second set of functions. It is understood that there are numerous examples of common variable types that may be used; tradable instrument and order quantity are merely two examples. In addition, the trading system's function editing mechanism may enable a user-selected set of functions to be created.

Another method of managing sets of functions in a trading system may include the steps of: within a trading system, providing a first set of two or more functions and a second set of two or more functions, wherein each of the functions in the first set and the second set includes a variable that is of a common variable type, wherein the value of the variable that is of the common variable type in the first set of functions and the value of the variable that is of the common variable type in the second set of functions may be different at a given point in time; receiving a first trigger for executing a first function from the first set of functions; immediately sequentially to receiving the first trigger, receiving a second trigger for executing a second function from the second set of functions; and sequentially executing the first function and the second function in response to receiving the first trigger and the second trigger. In certain embodiments within the method, the triggers may be user-actions. In some embodiments, the first trigger and the second trigger are user-directed and may be a user-selection such as a mouse click or a key press. In addition, it is understood that there are numerous examples of common variable types that may be used; tradable instrument and order quantity are merely two examples. In addition, the function editing mechanism may further enable a user-selected set of functions to be created.

The trading system provided in the method may further include a function editing mechanism through which the value of the variable that is of the common variable type in the first set of functions may be edited for each of the functions in the first set of functions without affecting the value of the variable that is of the common variable type in the second set of functions. In certain embodiments, the method further including the steps of: receiving a user command to edit the value of the variable that is of the common variable type in the first set of functions for each of the functions in the first set of functions without affecting the value of the variable that is of the common variable type in the second set of functions; and in response to the user command, editing the value of the variable that is of the common variable type in the first set of functions for each of the functions in the first set of functions without affecting the value of the variable that is of the common variable type in the second set of functions. It is understood that there are numerous examples of common variable types that may be used; tradable instrument and order quantity are merely two examples. In addition, the trading system's function editing mechanism may enable a user-selected set of functions to be created.

An advantage of the trading system is that functions included within two or more sets of functions referencing different tradable instruments are now able to be executed within the same trading system without at intermediate process, such as a toggle or switch between trading windows, wherein the one or more sets of functions may have a common variable type contained within the functions are able to be edited without affecting another set of functions within the trading system.

Another advantage of the trading system is that two or more sets of functions may be executed in the trading system, without at intermediate process, such as a toggle or switch between trading windows, wherein each set of functions has different values for variables of any common variable type, and wherein the common variable type contained within one set of functions are able to be edited as a group without affecting the other set of functions within the trading system.

Another advantage of trading system is that it allows users to edit and create sets of functions in a short amount of time with a low risk of error.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements. Throughout the disclosure herein, groups of related Figures may be referred to singularly. For example, FIGS. 15A-G are referred to collectively herein as FIG. 15.

FIG. 3 is an example of a dynamic association manager.

FIG. 15 is an example of a macro utility.

DETAILED DESCRIPTION OF THE INVENTION

Figure 1:
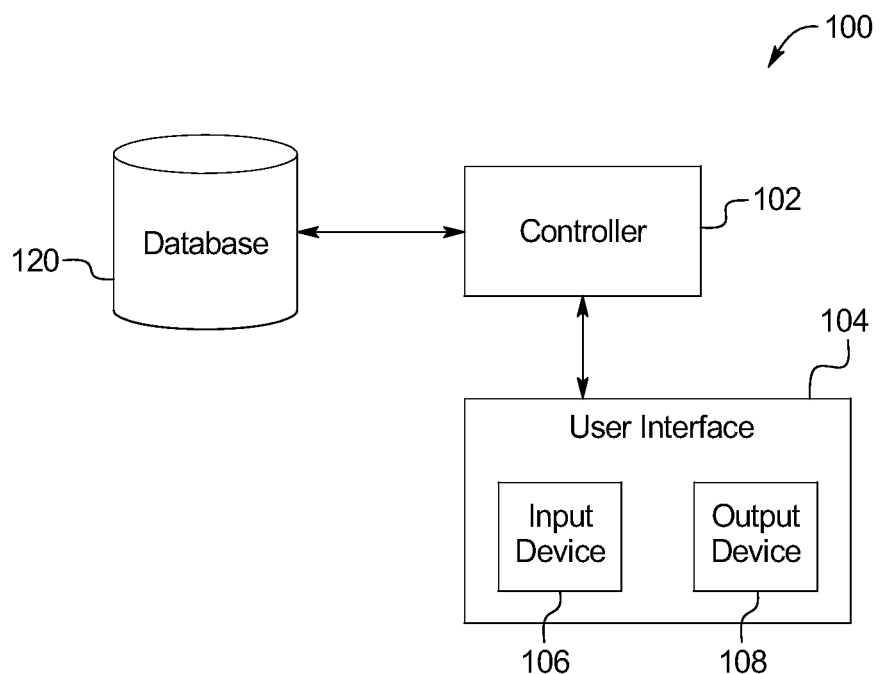
FIG. 1 is a schematic diagram of a trading system.

FIG. 1 illustrates an example of a trading system 100 ("the system 100"). As shown in FIG. 1, the system 100 includes a controller 102 and a user interface 104. As further shown, the user interface 104 includes an input device 106 and an output device 108 such that a user may communicate through the user interface 104 with the controller 102. One or more users may interact with the system 100 through the user interface 104. Further, it is contemplated that in other embodiments there may be any number of user interfaces 104 through which any number of users may interact with the system 100.

As further shown in FIG. 1, the trading system 100 may be in further communication with an associated database 120. However, it is understood that the database 120 may not be required in all embodiments of the system 100.

Although described as separate elements for clarity of the disclosure, it is contemplated that two or more of the features and functions of the controller 102, user interface 104, order entry system 100 and database 120 may all be embodied in a single physical device.

The system 100 allow users to create, edit, execute and otherwise manage multiple sets of functions within the trading system 100, as will be described in further detail herein. The management tools provided simplify the creation of sets of functions and macros and further enable users to edits sets and subsets of functions and hotkeys without simultaneously effecting undesired changes in other sets and subsets of functions and hotkeys. Various examples are described herein with reference to FIGS. 2-15. These examples are illustrative of the management tools taught by the present disclosure, though it will be apparent to those skilled in the art, that numerous management tools may be derived from the teachings of this disclosure.

Figure 2A:
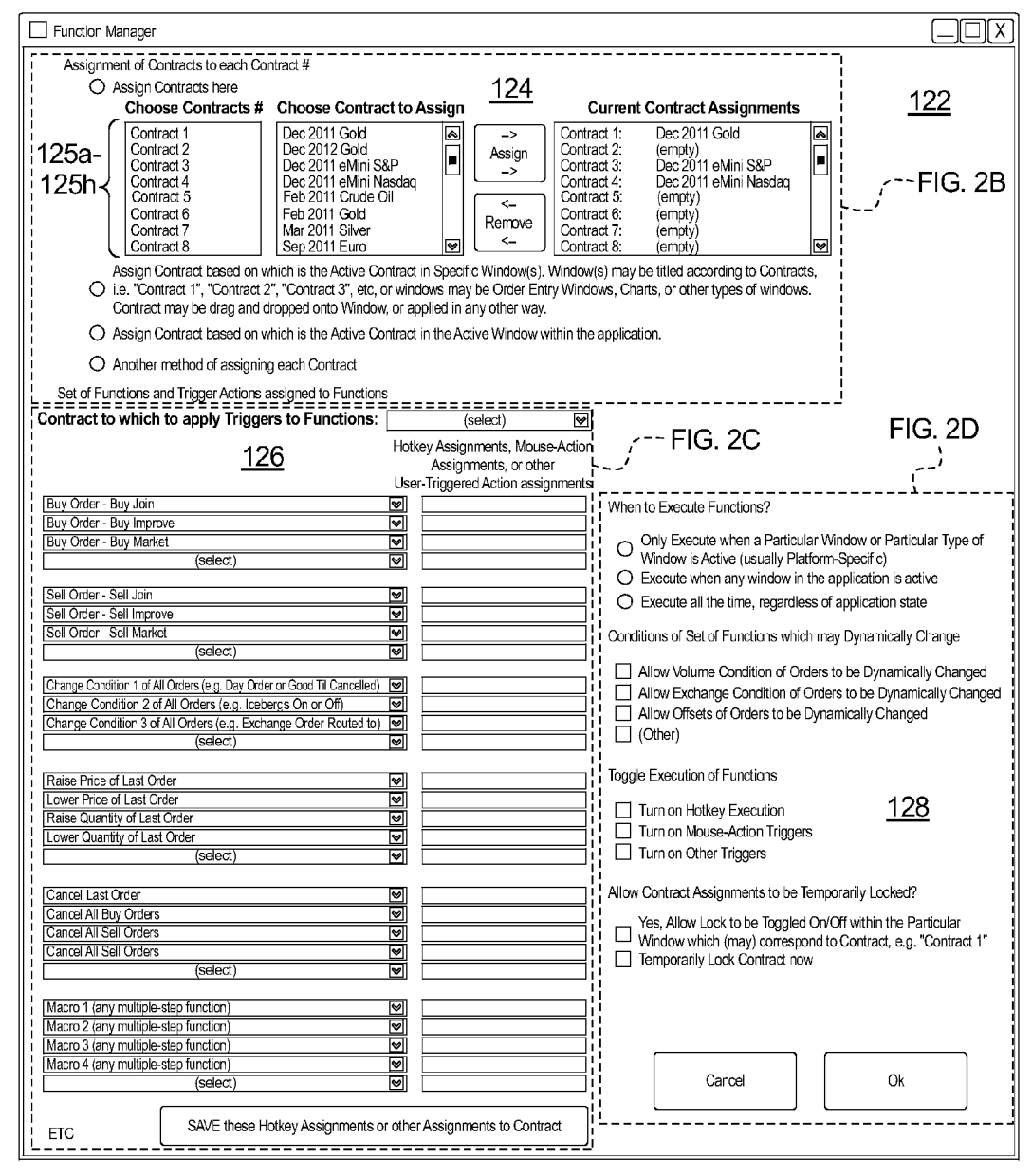
Figure 2B:
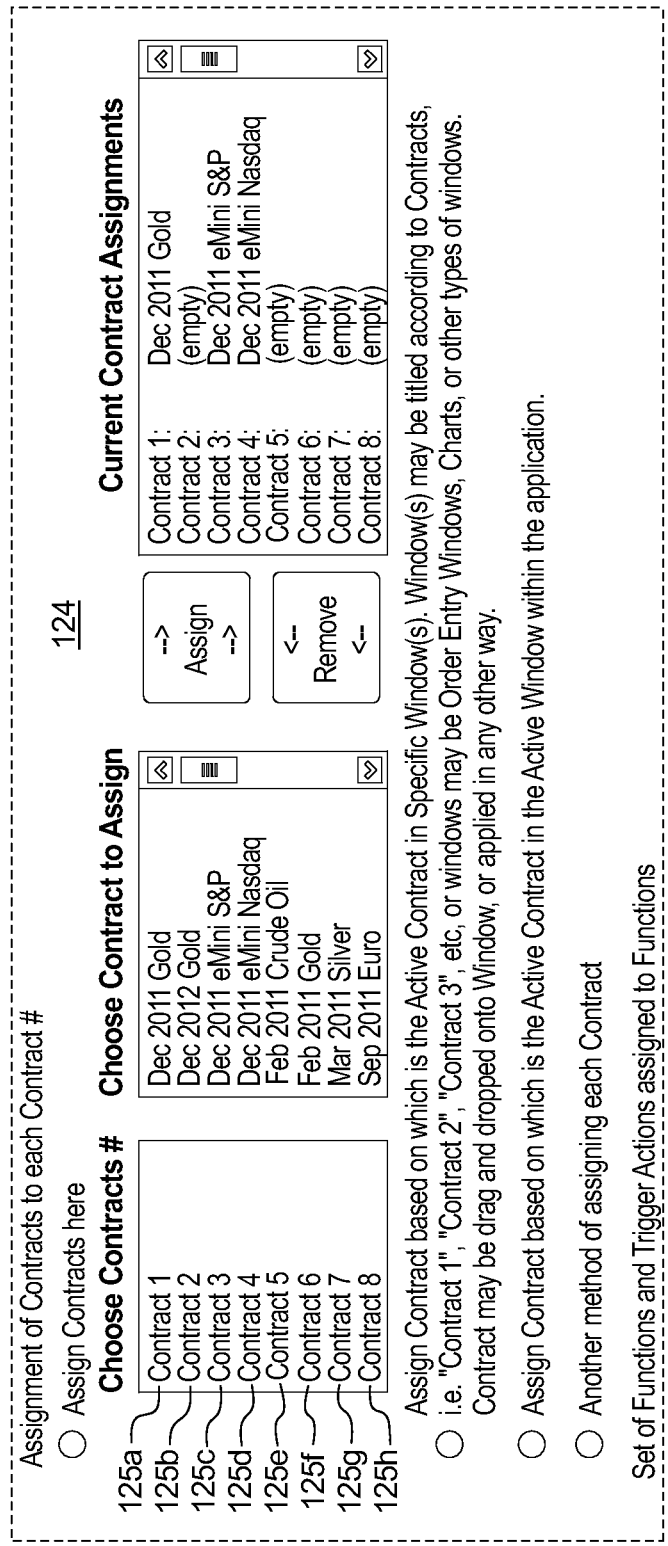
FIG. 2 is an example of a function manager.

Turning to FIG. 2, an example of a function manager 122 is shown. The function manager 122 shown in FIG. 2 includes three main sections: a tradable instrument assignment tool 124; a hotkey assignment tool 126; and a settings management tool 128. In the example shown in FIG. 2, the tradable instruments are contracts. However, it is understood that the function manager 122 may be adapted to manage functions and/or macros related to other types of tradable instruments, including contracts, stocks, bonds, etc.

As shown in FIG. 2, the tradable instrument assignment tool 124 enables a user to set up a number of tradable instrument templates 125a-125h. Each of the tradable instrument templates 125a-125h may have a specific tradable instrument assigned to them using the tradable instrument assignment tool 124. For example, as shown, Dec 2011 Gold may be assigned to Contract 1 125a, Dec 2011 eMini S&P may be assigned as Contract 3 125c, Dec 2011 eMini Nasdaq may be assigned as Contract 4 125d and Contracts 2 125b and Contracts 5-8 125e-h may be unassociated with tradable instruments. Even after tradable instrument assignments are made to tradable instrument templates 125, the tradable instruments assigned may be replaced by other tradable instrument assignments, such as by using the tradable instrument assignment tool 124 or other means. Such reassignments may be performed via a replacement of one tradable instrument with another, or by swapping two or more tradable instruments applied to two or more different tradable instrument templates 125 at the same time. In addition to the direct assignment tools provided in the tradable instrument assignment tool 124, in the example shown, there are various options provided for assigning tradable instruments to tradable instrument templates 125. For example, the tradable instrument assignment may be based on an association with the active windows in the user interface or other such interactive user controls, as discussed further herein.

The hotkey assignment tool 126 shown in FIG. 2 enables a user to set up hotkey assignments for each of a number defined functions or macros (e.g., specific buy and sell orders, condition controls, various cancellation actions, combinations thereof, etc.). The hotkey assignment tool 126 associates the hotkey assignments with the selected tradable instrument template 125 to which a tradable instrument (e.g., Dec 2011 Gold, Dec 2011 eMini S&P, etc.) may be assigned. The assignments are non-permanent and reassignments through the hotkey assignment tool 126 may be made at any time. During such a reassignment, either using a replacement or a swap, the hotkey associations with each of the functions or macros may be maintained, thus saving time and eliminating errors. Thus, after a user has used the hotkey assignment tool 126 to assign the hotkeys to functions or macros as part of a tradable instrument template 125 (e.g., Contract 1), any time a tradable instrument (e.g., gold) is assigned to the tradable instrument templates 125 (e.g., Contract 1), the hotkeys are correspondingly associated with the new tradable instrument (e.g., gold). This enables a user to dynamically edit the associated functions (and corresponding hotkeys) to swap out the prior tradable instrument for the updated tradable instrument, in other words, allowing the user to dynamically make efficient and powerful edits to the functions and hotkeys.

The example shown in FIG. 2 illustrates how the function manager 122 is used to manage various tradable instrument templates 125a-125h. As shown, each of the tradable instrument templates 125a-125h may have different tradable instruments assigned to them at various points in time. For example, at a first point in time, the tradable instrument template 125a may have the tradable instrument "Gold December 2011" assigned, and the tradable instrument template 125b may have the tradable instrument "Silver December 2011" assigned. At a second point in time, the tradable instrument template 125a may have the tradable instrument "Gold February 2012" assigned, and the tradable instrument template 125b may have the tradable instrument "Silver March 2013" assigned.

In other embodiments of the function manager 122, rather than tradable instrument templates 125a-125h, there may exist other types of templates, such as exchange templates (CME, ICE, NYSE, NASDAQ, etc), order quantity templates (one, five, 10, 25, maximum order size), order templates (buy, sell, buy to cover, sell short), as well as templates for any other order conditions such as iceberg conditions, order expiration conditions, all-or-none conditions, etc.

Because the function manager 122 enables the user to manage multiple templates, such as the tradable instrument templates 125a-125h as shown, and because each template may have distinctly assigned variables (whether tradable instrument or other type of variable such as exchange, order quantity, etc.), and because the functions or macros associated with each template may be independently triggered via dedicated hotkeys, mouse-clicks or other user-inputs, any functions or macros associated with two or more templates (e.g., tradable instrument templates 125a-125h) may be triggered in succession without the need for an intermediate process between the triggers for the functions or macros of the two or more templates.

In one example, a user trading with a keyboard may have functions and macros available to be triggered for the first tradable instrument associated with tradable instrument template 125a and functions and macros available to be triggered for the second tradable instrument associated with tradable instrument template 125b. The user may trigger functions and macros related to each of the two tradable instruments in immediate succession to one another (e.g., there is no need to "activate" the functions and macros related to the second tradable instrument after triggering a function or macro related to the first tradable instrument—both sets of functions and macros are available to be triggered at all times). Because the templates (e.g., tradable instrument templates 125a-125h) are able to be edited (e.g., allow replacement of variables), the templates are more functional than groups of functions and/or macros with fully static components. Note that if the templates were not able to have their variables edited, then if a user wanted to use a different variable (e.g., a different tradable instrument), they would waste lots of time repeating the creation and editing of the associated functions or macros. Further, if the functions or macros associated with each template could not be triggered in succession to functions or macros associated with a different template, then the trader would not be able to perform trading functionality (e.g., order entry) as efficiently. Accordingly, the ability to trigger functions and macros in succession and without intermediate actions required, the functions and macros associated with a plurality of templates with editable variables, is a dramatic improvement over existing systems.

One of the advantages of the system 100 provided herein is that the system 100 enables users to work with multiple sets of functions that have different values for common variable types. For example, in a first set of functions the value of the variable type "tradable instrument" is "Gold December 2011" and in a second set of functions the value of the variable type "tradable instrument" is "Silver December 2011." Through the features and benefits provided by the system 100, a user is able to execute functions related to "Gold December 2011" from the first set of functions immediately before and/or after executing functions related to "Silver December 2011" without having to take any action, and without the system 100 having to take any action, to allow a function from one of the sets of functions to be executed sequentially to the execution of a function from the other set of functions. In this context, sequential execution refers to the lack of any other action (by the user or the system 100) occurring between the triggering of at least one function from each of the sets of functions. Two functions may be "executed sequentially" regardless of the amount of time which passes between their execution. While this benefit is illustrated here with reference to FIG. 2, and particularly with reference to the tradable instrument templates 125a-125h, it is a feature that is broadly applicable throughout the system 100.

The reason it is important to avoid an intermediate process is that it can cause delay. Consider an example where two functions (or macros) are to be submitted through an order entry window, a first function to buy a first stock (such as DELL) and a second function to buy second stock (such as MSFT), but between the trigger of these two functions the user needs to select the second stock (MSFT). In some instance, after the submission of the first function (related to the first stock), the user is required to activate the second stock (by mouse-click, drag and drop, key-press, etc.), which changes the functionality of the order entry window to correspond to the second stock. In some systems, the intermediate process may cause the trader to divert his attention quite sharply from trading. In another example of a system where a trader trades with a keyboard, there may be two order entry windows open on the GUI at the same time. Each order entry window may correspond to a different set of functions, each set of functions corresponding to a different tradable instrument. In order to execute functions corresponding to one of the tradable instruments, the corresponding order entry window must be active. Accordingly, to execute functions related to the two tradable instruments, the user must switch between activating the two corresponding order entry windows. In other words, after triggering a first function to buy a first stock using a key on the keyboard, the trader has to perform the intermediate process of selecting the order-entry window on the GUI corresponding to the second stock using the mouse, only then to have to go back to using the keyboard to trigger a second function to buy the second stock. These intermediate processes are wasteful. Avoiding needing to take any intermediate action between triggering functions from different sets of functions is powerful and beneficial to users of the system 100.

As further shown in FIG. 2, the settings management tool 128 enables a user to configure various settings associated with the function manager 122. In the example shown, the settings management tool 128 enables a user to select: when functions are to be executed (e.g., only when a particular window is active, anytime the application is active, or anytime regardless of application state); whether and which conditions within the hotkey functions may dynamically change (e.g., whether the order quantity condition of orders may be dynamically changed, whether the exchange condition of orders may be dynamically changed, etc.); controls for toggling on and off the hotkeys and various triggers; and controls for temporarily locking a tradable instrument's template 125 association with a particular user window (e.g., Contract 1 locked to a particular order entry window). Of course, numerous other settings may be made available and managed through the setting management tool 128, many of which will be apparent to one skilled in the art based on the descriptions provided herein.

Turning now to FIG. 3, an example of a dynamic association manager 130 is provided. The dynamic association manager 130 is a tool through which a user may dynamically associate tradable instruments 132 to order entry windows 134a-134d. As shown in FIG. 3, a drag-and-drop procedure may be implemented to dynamically associate various tradable instruments 132 with the order entry windows 134a-134d. It is contemplated that the order entry windows 134a-134d shown in FIG. 3 may alternatively be other types of windows, such as charts, or time and sales windows, or any other suitable window for which tradable instrument 132 (or other variable) association may be beneficial. In other examples, instead of a drag-drop procedure, a list box, combo box or other method may be applied to dynamically associate various tradable instruments 132 with the order entry windows 134a-134d. As shown, an "add/remove order entry window" button 133 (or possibly separate controls) may be provided to adjust the number of order entry windows 134a-134d in the dynamic association manager 130. In the example shown, if an order entry window 134 is selected when the "add/remove order entry window" button 133 is triggered, the order entry window 134 is removed and if no order entry window 134 is selected when the "add/remove order entry window" button 133 is triggered, a new order entry window 134 may be provided. If separate controls (instead of one "add/remove order entry window" button 133) were provided as in other examples, other methods for adding/removing order entry windows would apply.

Using the functionality suggested by the arrows in FIG. 3, the user may drag-and-drop any of the specific tradable instruments 132 into any of the order entry windows 134a-134d, thus dynamically associating the pair as desired. Of course it is understood that the drag-and-drop procedure is merely one example of a method for making the associations between the tradable instruments 132 and the order entry windows 134a-134d, other methods, including drop down menus and other selection tools may be equally beneficial.

Viewed in combination, the function manager 122 (FIG. 2) and the dynamic association manager 130 (FIG. 3) allow a user to efficiently setup and manage hotkey associations for given tradable instruments 132 and then apply those functions to a given order entry windows 134a-134d. These systems and methods provide useful and efficient tools for managing these associated functions.

The dynamic association manager 130 shown in FIG. 3 is one example of a tool that enables the simultaneous editing the variable of a common variable type of a set of functions or macros without affecting the value, status or condition of a common variable type in a second set of functions or macros (e.g., changing the tradable instrument 132 used in the functions associated with a first tradable instrument template 134a without changing the tradable instrument 132 used in the functions associated with a second tradable instrument template 134*b*). The tradable instrument templates 134*a*-134*d* demonstrate another example of the flexibility of the templates described above with reference to FIG. 2. In this example, the user is able to dynamically edit a tradable instrument template 134 by dragging a tradable instrument 132 onto the tradable instrument template 134, and in response the dynamic association manager 130 edits the variable in the functions macros associated with the tradable instrument template 134. In other examples, the dynamic association manager 130 may be used to dynamically edit variables other than tradable instruments 132 across a plurality of templates. There are numerous instances in which this type of dynamic editing of functions may be useful and numerous examples of ways in which it may be implemented. Additional examples are provided herein.

Dynamically editing sets of functions and associated hotkeys in this manner prevents the user from having to edit a large number of functions and hotkeys manually, thus saving the user much time and frustration. Providing a "find and replace" or "swap" type command for a given variable and enabling a user to group functions into sets during the editing process so as to edit the variable within one or more sets and not within other sets is believed to be a very powerful tool for managing functions and hotkeys in a trading system. The benefits are particularly noticeable when performing edits to a set of functions that are assigned to hotkeys. By being able to swap in a new variable for an existing function associated with a hotkey, without requiring new functions to be built and associated with hotkeys, the opportunity for costly mistakes in the function building and hotkey association steps may be greatly reduced.

The examples provided with respect to FIG. 3 focuses on dynamically editing the tradable instrument 132 associated with a set of functions, macros and hotkeys. In another such example, tradable instrument templates 134*a*-134*d* may each be associated with different levels of risk management. For example, the functions, macros and hotkeys associated with tradable instrument templates 134*a* are all relatively small sized orders, those associated with tradable instrument templates 134*b* are larger, those associated with tradable instrument templates 134*c* are larger still, and those associated with tradable instrument templates 134*d* are the largest. As such, a user can drag a given tradable instrument 132 to tradable instrument templates 134*a* when the user wants to trade more cautiously and may drag the given tradable instrument 132 to tradable instrument templates 134*d* when the user wants to trade more aggressively.

Further, it is understood that the tradable instrument 132 is only one example of a variable that may be dynamically edited in a set of functions, macros and hotkeys. In an alternative example, the dynamic association manager 130 may be adapted to enable a user to dynamically drag and drop (other otherwise associate) selected variables with a given set of functions, macros and hotkeys. For example, a user may employ the dynamic association manager 130 to dynamically change the order quantity for each of the functions, macros and hotkeys to equal ten, may turn the "iceberg" order condition on for each of the functions, macros and hotkeys, may turn the "fill or kill" order condition, etc.

Figure 4A:
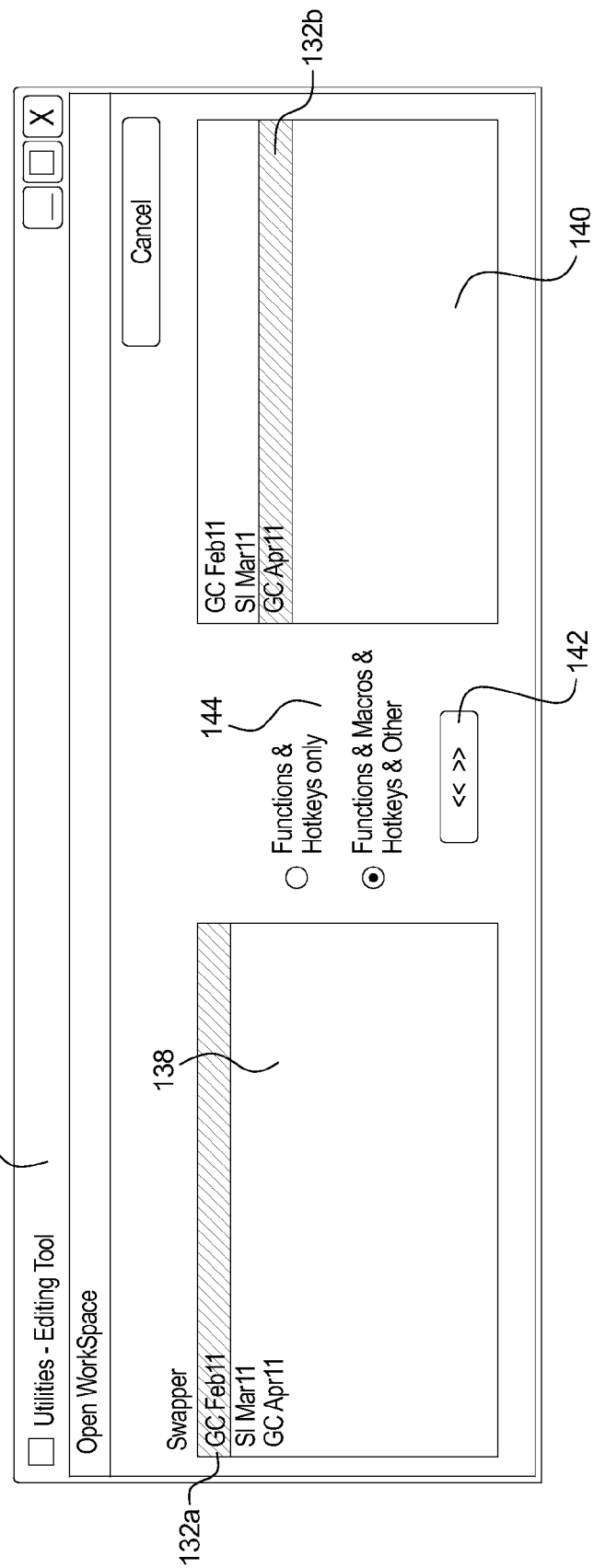
FIG. 4a is an example of an editing tool shown in a first state.
Figure 4B:
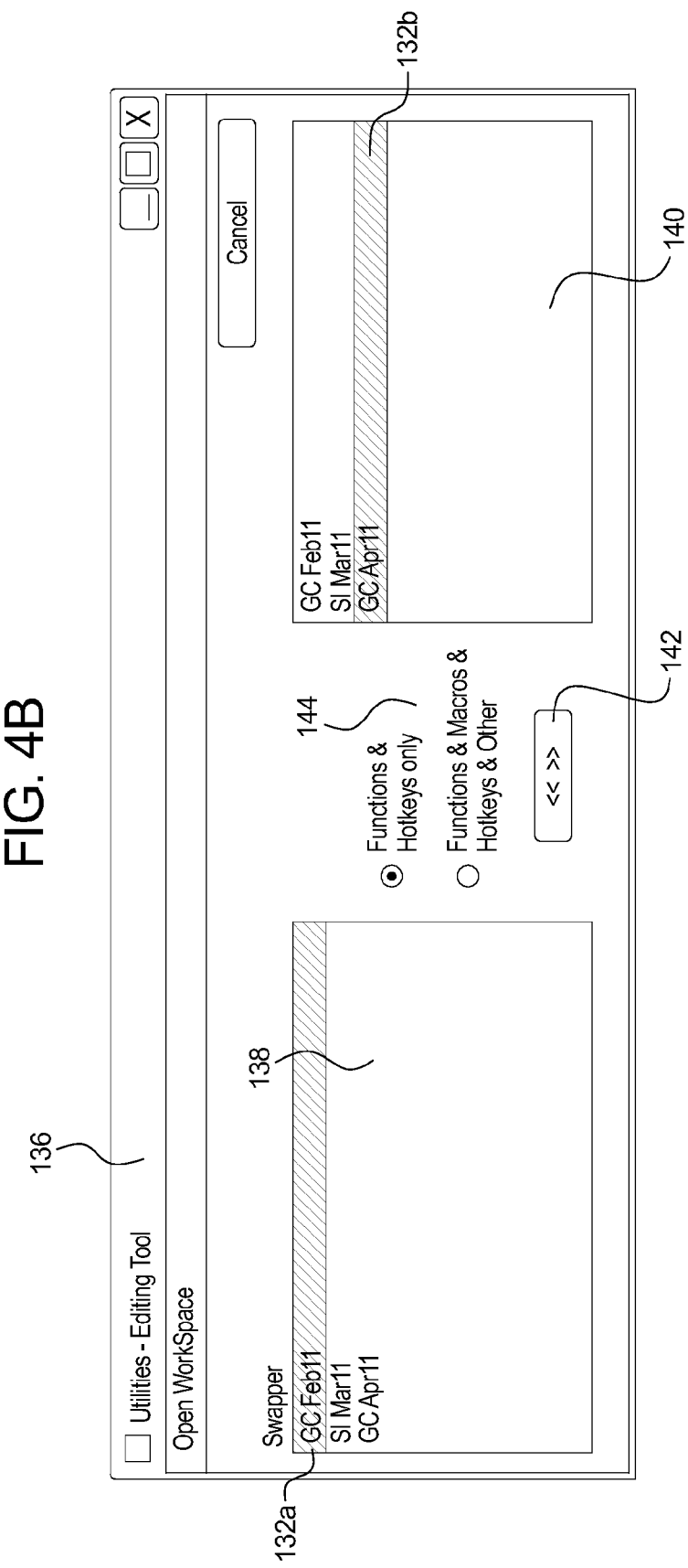
FIG. 4b is the editing tool of FIG. 4a shown in a second state.

Turning now to FIGS. 4*a* and 4*b*, an editing tool 136 is provided through which a user may swap a selected tradable instrument 132*a*, associated with a first set of functions, macros and associated hotkeys (or only functions and associated hotkeys), with a selected tradable instrument 132*b*, associated with a second set of functions, macros and associated hotkeys (or only functions and associated hotkeys). As shown in FIGS. 4*a* and 4*b*, the editing tool 136 includes a first list of tradable instruments 138, each associated with sets of functions, macros and hotkeys, and a second list of tradable instruments 140, each associated with sets of functions, macros and hotkeys. A swap command button 142 is provided along with a toggle selector 144 that enables a user to select between a "functions and hotkeys only" setting and a "functions & macros & hotkeys & other" setting.

In the example shown in FIG. 4*a*, a user may swap a first tradable instrument 132*a*, associated with a set of functions, macros and associated hotkeys, and which is selected form the first list 138, with a second tradable instrument 132*b*, associated with a set of functions, macros and associated hotkeys, and which is selected from the second list 140. Specifically, each set of functions, macros and associated hotkeys has at least one value for a tradable instrument variable referenced by the functions or macros swapped with a different tradable instrument value.

In the example shown in FIG. 4*b*, a user may swap a first tradable instrument 132*a*, associated with only a set of functions triggered by hotkeys (or mouse clicks, etc), and which is selected form the first list 138, with a second tradable instrument 132*b*, associated with another set of functions triggered by hotkeys (or mouse clicks, etc), and which is selected from the second list 140.

Though not shown in FIGS. 4*a* and 4*b*, it is contemplated that the editing tool 136 may be alternatively configured such that the functions and associated hotkeys (or the functions, macros and associated hotkeys) associated with each of two tradable instruments 132 may be swapped instead of the tradable instruments 132 themselves being swapped, to accomplish generally the same end result.

In the example shown in FIG. 4*a*, a swap command is to be executed to swap GC Feb11 (the first tradable instrument 132*a* selected from the first list 138) with GC Apr11 (the second tradable instrument 132*b* selected from the second list 140) for all references made to GC Feb11 by functions, macros and associated hotkeys.

In the example shown in FIG. 4*b*, a swap command is to be executed to swap GC Feb11 (the first tradable instrument 132*a* selected from the first list 138) with GC Apr11 (the second tradable instrument 132*b* selected from the second list 140) for all references made to GC Feb11 by functions and their associated hotkeys.

In the examples described with reference to FIGS. 4*a* and 4*b*, such swapping may occur at the global level (i.e., any reference to the first tradable instrument 132*a* is replaced by the second tradable instrument 132*b*), at the tradable instrument template 125 level (i.e., only references to the first tradable instrument 132*a* made within the first tradable instrument template 125 are replaced by the second tradable instrument 132*b*), within a certain selected set of functions and/or macros, system-generated group of functions and macros, etc.

Figure 5:
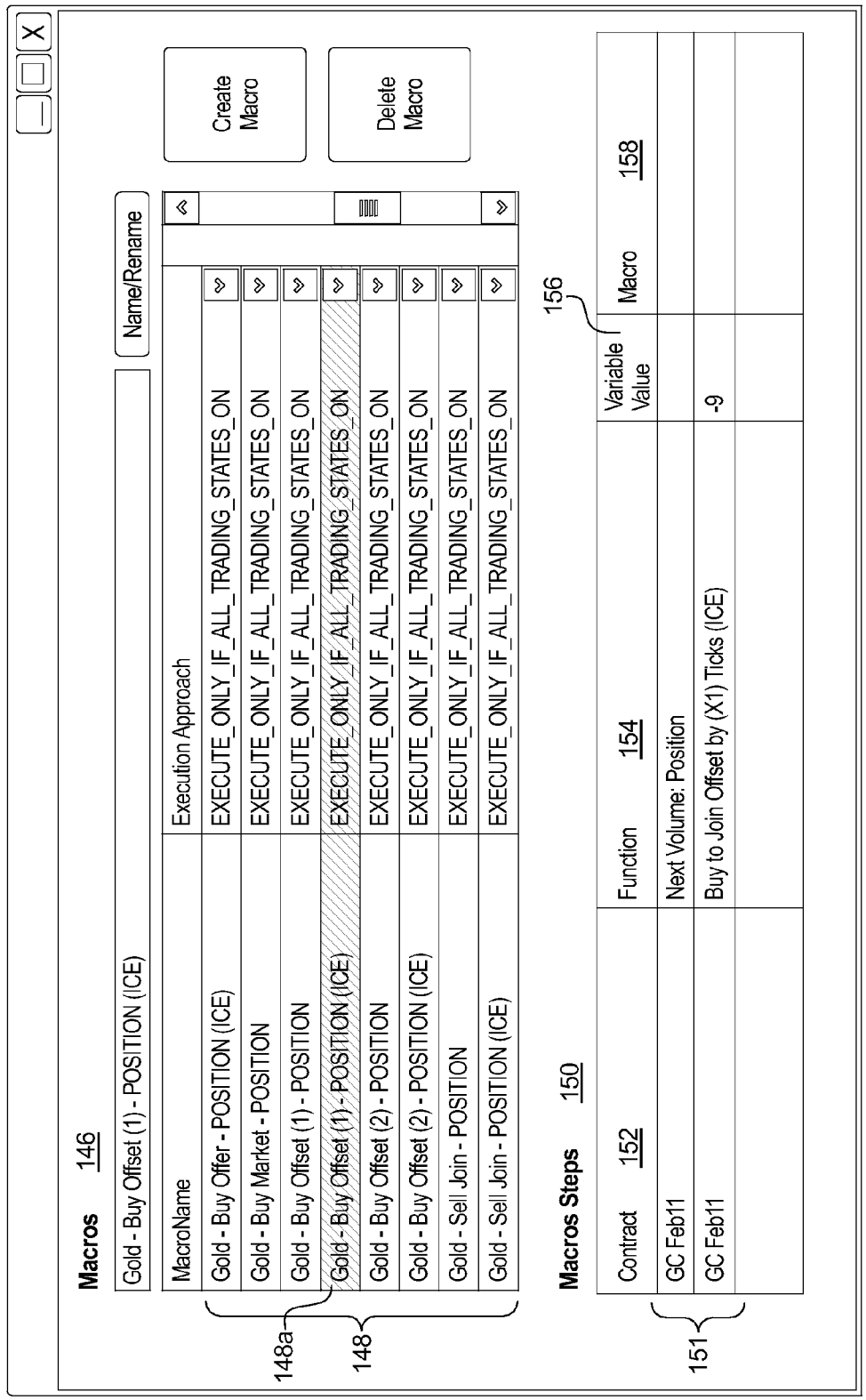
FIG. 5 is a partial view of an example of a macro building tool shown in a first state.
Figure 6:
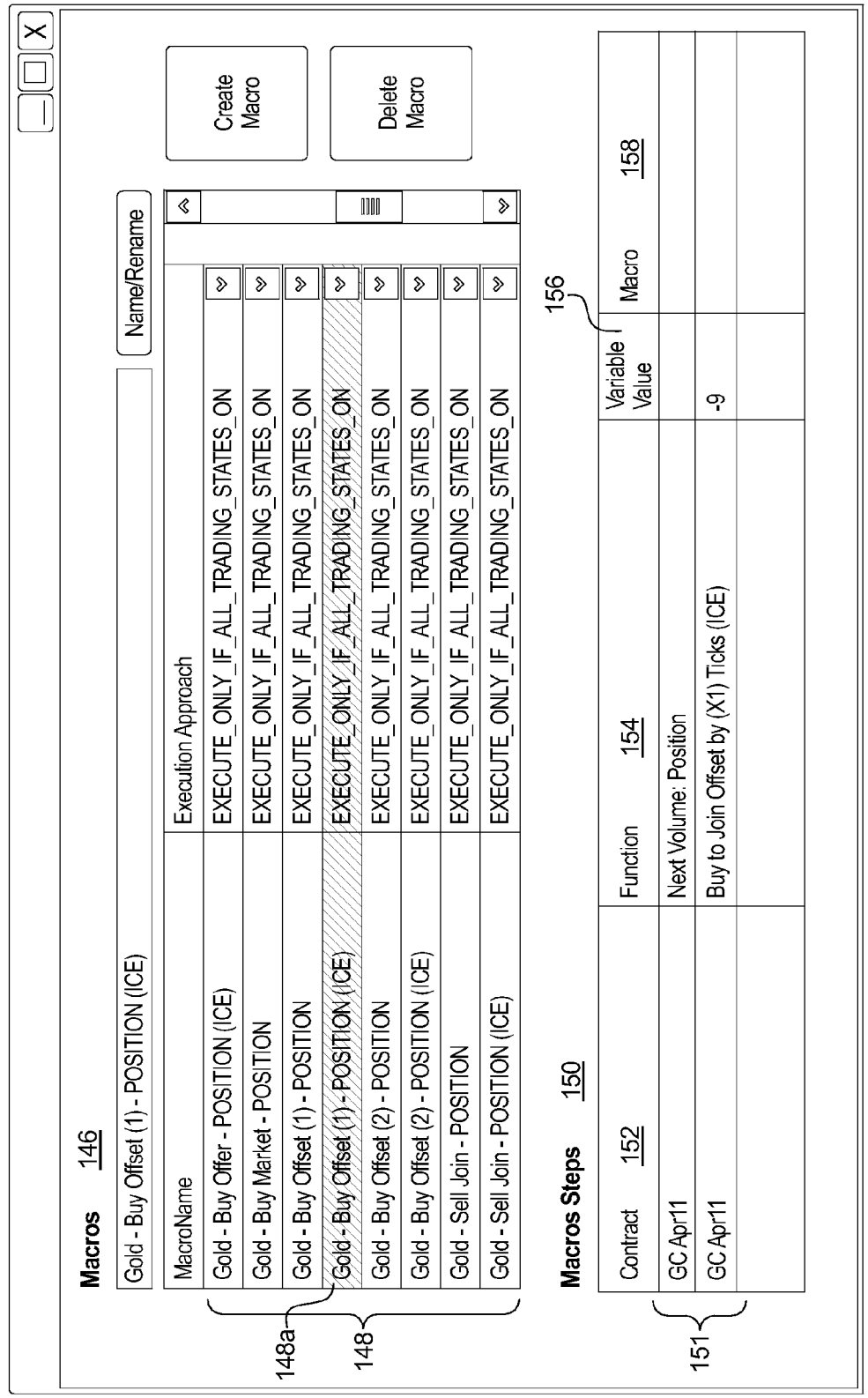
FIG. 6 is the macro building tool of FIG. 5 shown in a second state.

FIGS. 5-10 illustrate the effect of the editing tool 136 shown and described with respect to FIGS. 4*a* and 4*b*. As shown in FIGS. 5 and 6, a macro window 146 is provided showing a list of macros 148. Within the macro window 146 a selected macro 148*a* is shown as being highlighted. For the selected macro 148*a*, the associated macro steps 151 are provided within a macro steps window 150. For each macro step 151, there is a column showing the associated tradable instrument 152 (shown as "contract" in FIGS. 5, 6 & 11), the associated function 154, the associated variable value and the associated macro 158. Each macro step 151 will either have an associated tradable instrument 152 and function 154 (and optionally an associated variable 156) or an associated macro 158, depending on whether a function 154 or macro 158 is being called within the macro step 151. If the macro step 151 has an associated tradable instrument 152 and function 154 (and optionally an associated variable 156), then it is noted that the function 154 executes for the associated tradable instrument 152 and possibly using the associated variable 156.

Looking at FIG. 5, the selected macro 148a includes two macro steps 151. As shown, the associated tradable instrument 152 for each macro step is GC Feb11 (the first tradable instrument 132a selected from the first list 138 shown in FIG. 4a). Accordingly, FIG. 5 illustrates the contents of the selected macro 148a associated with the first tradable instrument 132a.

FIG. 6 shows the selected macro 148a after the swap command shown in FIG. 4a has been executed (i.e., to swap GC Feb11 with GC Apr11 for all references made to GC Feb11 by functions, macros and associated hotkeys). As shown in FIG. 6, the only variable within the macro steps 151 that has changed is the tradable instrument 152, for which GC Apr11 has replaced GC Feb11.

While FIGS. 5 and 6 only show the macro steps 151 within one selected macro 148a and the selected macro 148a has a limited number of macro steps 151, it can easily be understood that a user may effect a great number of edits within a group of macros 148 and all of their associated macro steps 151 very efficiently using a simple editing tool 136 such as the one shown in FIGS. 4a and 4b. These edits may be performed upon tradable instrument or other variables.

While FIGS. 5 and 6 show the effects the editing tool 136 shown in FIG. 4a with respect to a set of associated macros 148 (and their associated functions 154 (and optionally variable values 156)), FIGS. 7-10 are provided to illustrate the effects of the editing tool 136 shown in FIG. 4b on functions and their associated hotkeys.

FIGS. 7-10 illustrate a hotkey mapper interface 160 that provides a list of tradable instruments 162 for which one selected tradable instrument 162a is shown as highlighted. For the selected tradable instrument 162a function window 164 shows all of the functions associated with the selected tradable instrument 162a. Within the function window 164, there are columns showing the function 168, the variable value 170 (if any) and the associated hotkey 172.

Figure 7:
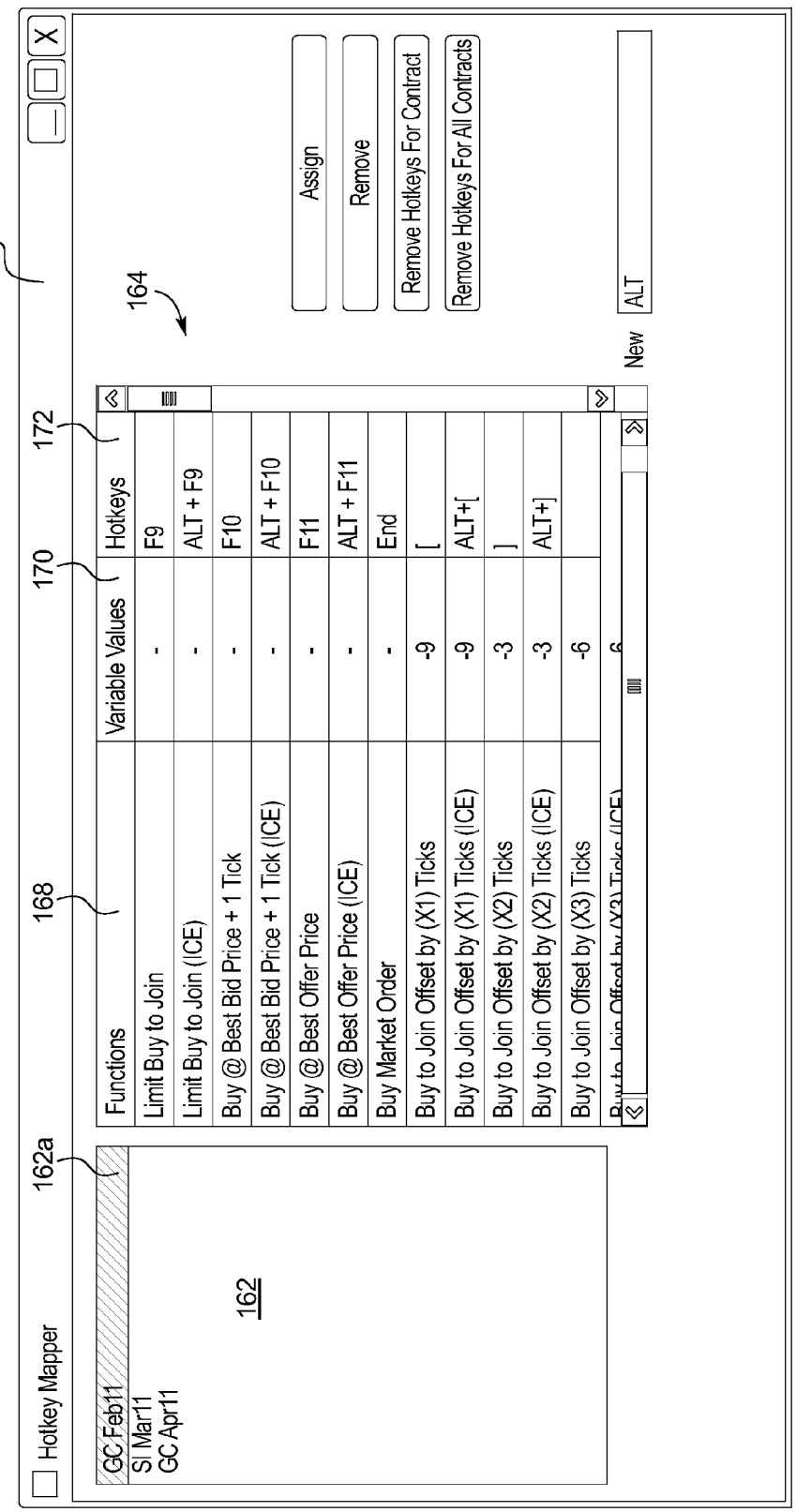
FIG. 7 is an example of a hotkey mapper interface shown in a first state.
Figure 8:
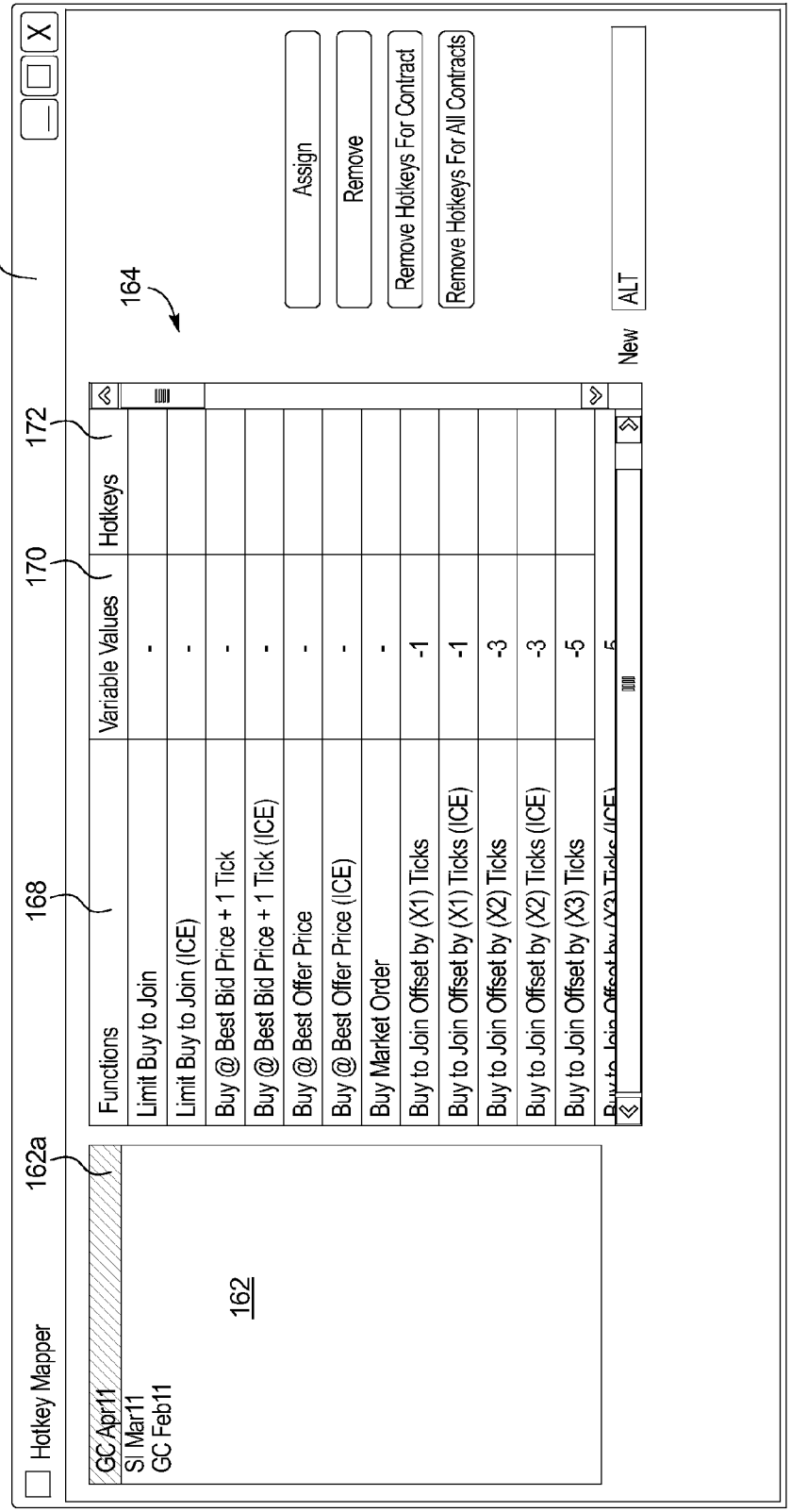
FIG. 8 is the hotkey mapper interface of FIG. 7 shown in a second state
Figure 9:
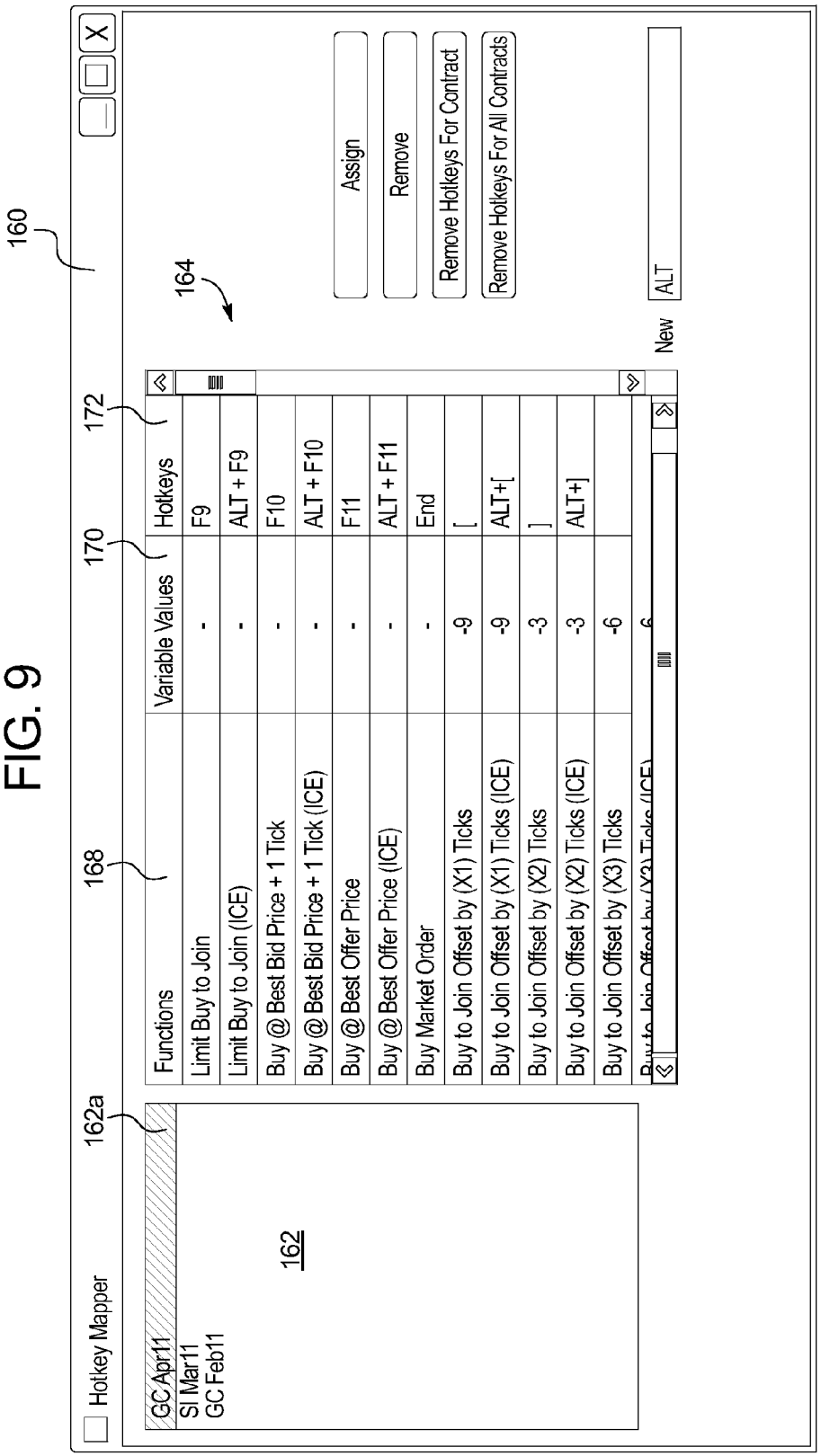
FIG. 9 is the hotkey mapper interface of FIG. 7 shown in a third state.
Figure 10:
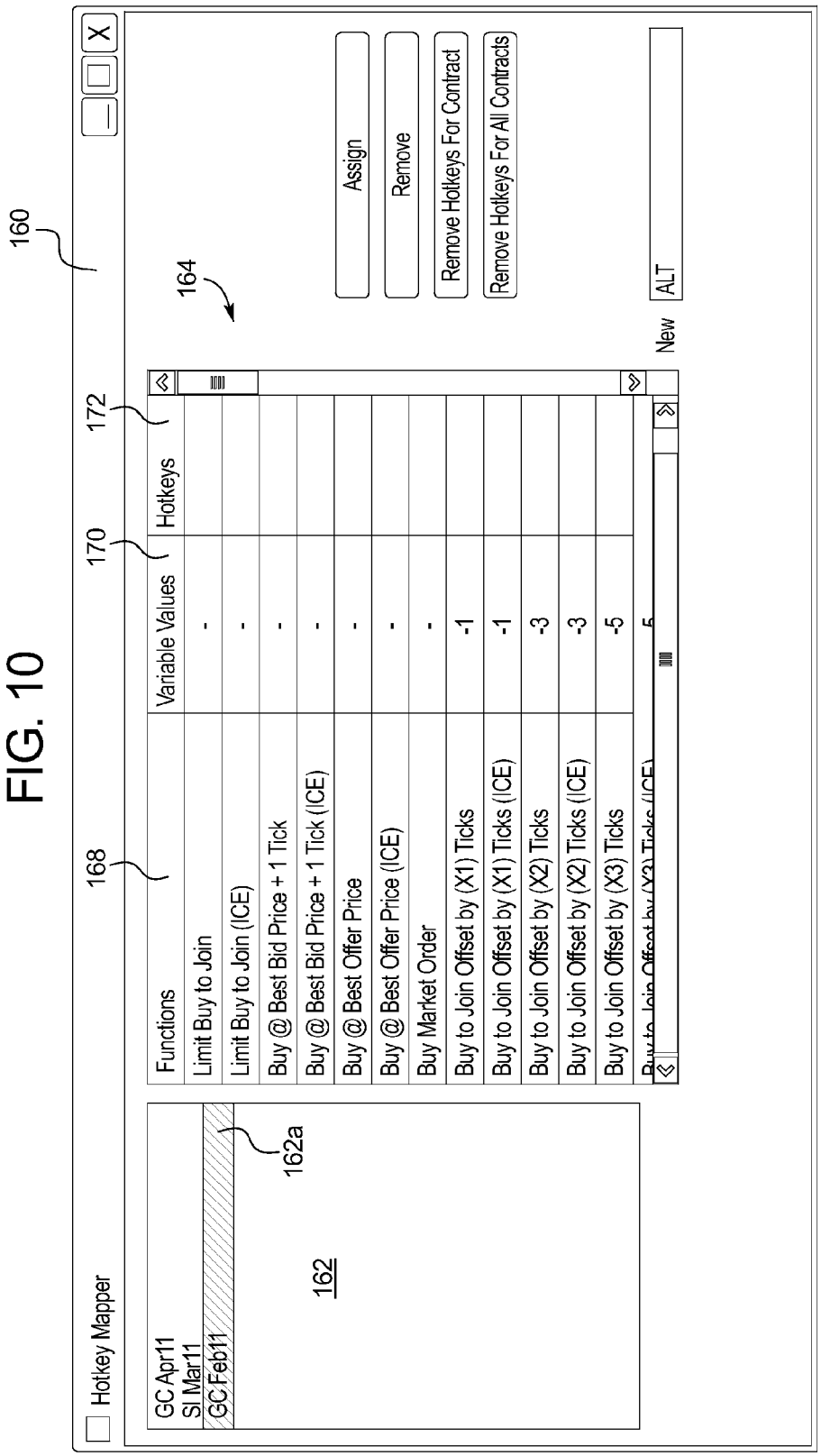
FIG. 10 is the hotkey mapper interface of FIG. 7 shown in a fourth state.

FIG. 7 shows the hotkey mapper interface 160 with the selected tradable instrument 162a being GC Feb11 prior to effecting the swap illustrated in FIG. 4b. FIG. 8 shows the hotkey mapper interface 160 with the selected tradable instrument 162a being GC Apr11 prior to the swap. FIG. 9 shows the hotkey mapper interface 160 with the selected tradable instrument 162a being GC Apr11 after the swap. FIG. 10 shows the hotkey mapper interface 160 with the selected tradable instrument 162a being GC Feb11 after the swap. As shown by comparing the function windows 164 across FIGS. 7-10, the associated hotkeys 172 shown in the function windows 164 have been swapped between the two tradable instruments 162.

Figure 11:
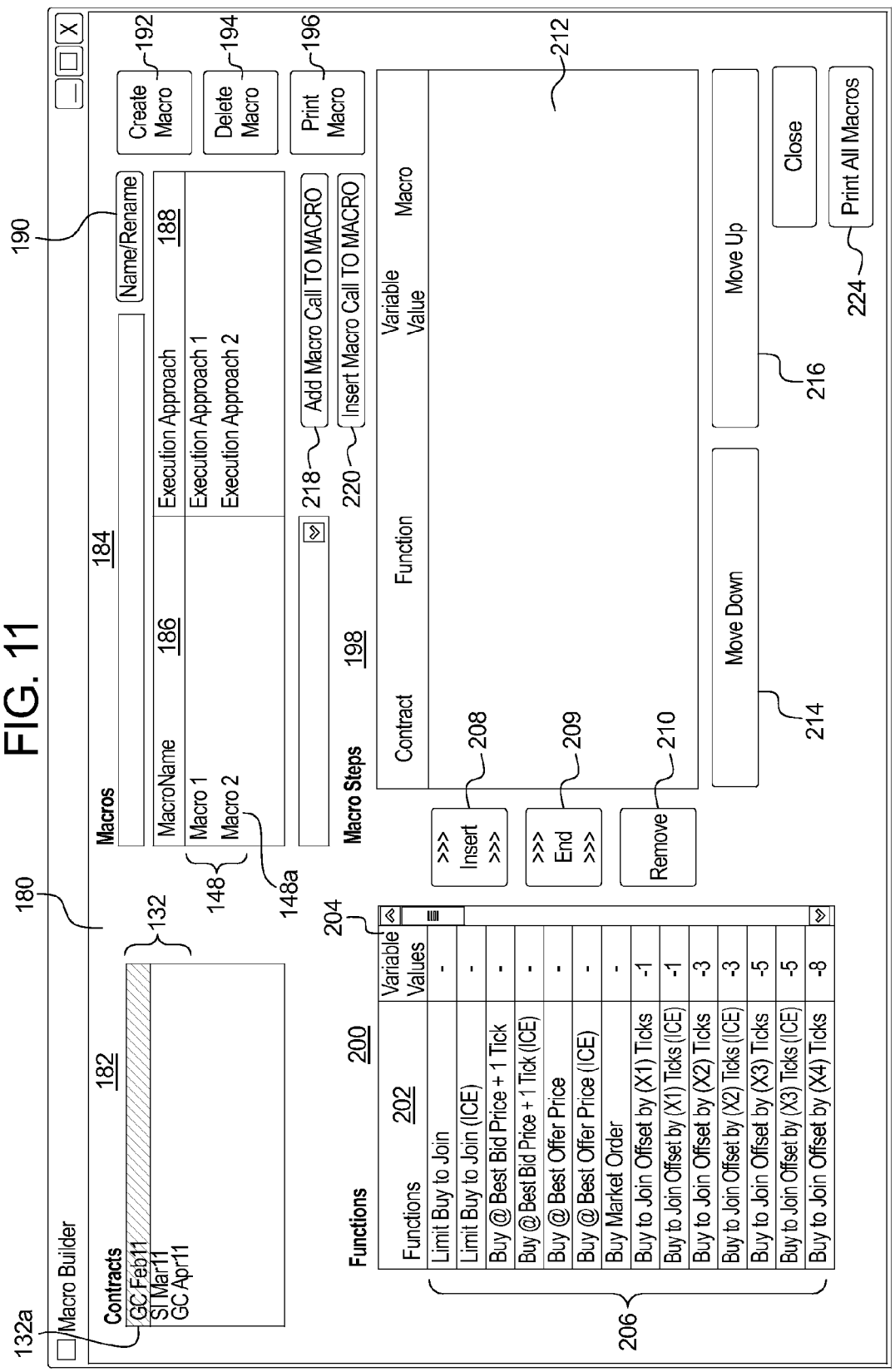
FIG. 11 is an example of a macro building tool.

Turning now to FIG. 11, a macro building tool 180 is provided through which a user may create macros 148 for use in the system 100. As shown in FIG. 11, one or more tradable instruments 132 (in this example, GC Feb11) are provided in a list of tradable instruments 132 in a tradable instruments section 182 (shown as "contracts" in FIG. 11). Using the macro building tool 180, a user may create one or more macros 148 which may each include either one or more functions for one or more selected tradable instruments 132, one or more calls to one or more other macros, or a combination of both one or more functions and one or more macro calls.

The macros section 184 includes a macro name column 186 and an execution approach column 188. In addition, within the macros section 184, there are numerous associated controls, including: a "name/rename" control 190 through which a user may edit the name of a selected macro 148a; a "create macro" control 192 through which a new macro 148 may be created; a "delete macro" control 194 through which a macro 148 may be deleted; a "print macro" control 196 through which the elements of a macro 148 may be printed. For a given selected macro 148a, the macro 148a may be edited in the macro steps section 198.

As shown, the macros steps section 198 may include either one or more functions for one or more selected tradable instruments 132, one or more calls to one or more other macros, or a combination of both one or more functions and one or more macro calls. Within the functions section 200, there is a function column 202 and a variable value column 204, which provides a list of functions 206 that may be used within a macro 148. An insert control 208, an end control 209, and a remove control 210 allow a user to insert and remove functions 206 into and from the selected macro 148a, respectively. Inserting a function 206 adds the selected function 206 to the macro steps window 212 in the location before the macro step which is highlighted if the insert control 208 is used, or at the end of the macro if the end control 209 is used. A user may use a "move down" control 214 and a "move up" control 216 to adjust the order of the functions 206 within the macro 148. An "add macro call to macro" control 218 and an "insert macro call to macro" control 220 are provided to enable a user to add and insert macro calls to any other macros from within any location of the selected macro 148a. Like the functions 206, the macro calls may then be manipulated by the "move down" control 214 and the "move up" control 216. As further shown in FIG. 11, a "print all macros" control 224 is provided such that a user may print for review or to save a copy of the macros 148.

As shown, the macro building tool 180 may be used to create a number of macros 148 which may contain references to any number of tradable instruments 162, as well as other variables which may be edited by and created by the management tools provided herein. Of course, the macro building tool 180 shown in FIG. 11 is merely one example of a macro building tool 180 that may be used to create and edit macros 148.

Figure 12:
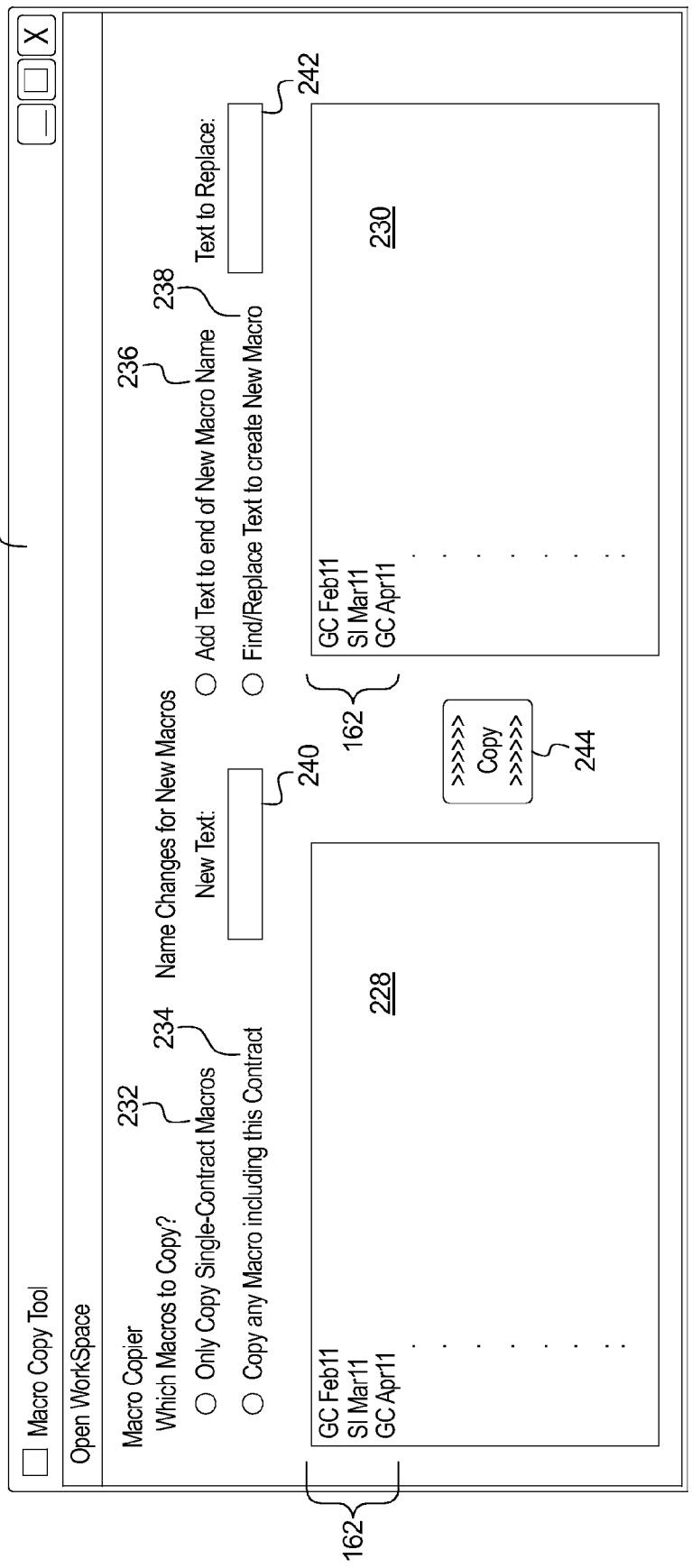
FIG. 12 is an example of a macro copy tool

Turning to FIG. 12, an example of a macro copy tool 226 is provided. A macro copy tool 226 enables a user to replicate macros 148 and to create new macros 148 by replacing one or more elements of a selected group of macros 148. In the example provided in FIG. 12, the user may select a group of macros 148 including references to a first tradable instrument 162 (selected from a first list of tradable instruments 162 in a first tradable instrument window 228) to copy and create a second group of macros 148 in which the first tradable instrument 162 is replaced with a second tradable instrument 162 (selected from a second list of tradable instruments 162 in a second tradable instrument window 230). Through this macro copy tool 226, a new group of macros 148, even one with a large number of macros 148, may be quickly created by editing a common element in an existing group of macros 148.

Various options are provided in the macro copy tool 226 to affect the copying process. For example, the user may choose whether the group of macros 148 to copy should include only those macros 148 which include only references to the first tradable instrument 162 (using the "only copy single-contract macros" control 232) or whether the group of macros 148 to copy should include any macro including the first tradable instrument 162 (using the "copy any macro including this contract" control 234), regardless of whether other tradable instruments 162 are also referenced. Other options include user selections for how names are provided for the newly created set of macros 148. For example, an "add text to new macro name" control 236 is provided is a first user option for naming the newly copied macros 148. Alternatively, a "find/replace text to create new macro" control 238 is provided through which a user may choose to provide new text in a "new text" text box 240 to replace the text identified in a "text to replace" text box 242. A copy control 244 is provided to initiate the copying process described herein.

For example, as shown in FIG. 12, using the macro copy tool 226, a user may select a tradable instrument 162 in the first tradable instrument window 228 (e.g., "GC Feb11"), select a tradable instrument 162 in the second tradable instrument window 230 (e.g., "SI Mar11"), select the "only copy single-contract macros" control 232, and select the "find/replace text to create new macro" control 238, while entering "Silver" in the "new text" text box 240 and entering "Gold" in the "text to replace" text box 242. In this example, all single-contract macros that currently exist in the system 100 that include the "GC Feb11" tradable instrument 162 will be copied with the tradable instrument 162 being changed to "SI Mar11". Further, the text "Gold" will be replaced with "Silver" in the titles and/or descriptions of the newly copied macros 148.

Even though the example of the macro copy tool 226 shown in FIG. 12 enables a user to create a new group of macros 148, the macro copy tool 226 can easily be modified to allow editing of a group of macros 148 without creating a new set of macros 148. For example, with only minor modifications to the macro copy tool 226 to allow editing of a group of macros 148, a group of macros 148 could be edited such that a tradable instrument referenced by the group of macros 148 is edited, such that one or more parts of the macro titles common to the group of macros 148 is edited, such that text is added to the end of all macros 148, etc.

Figure 13:
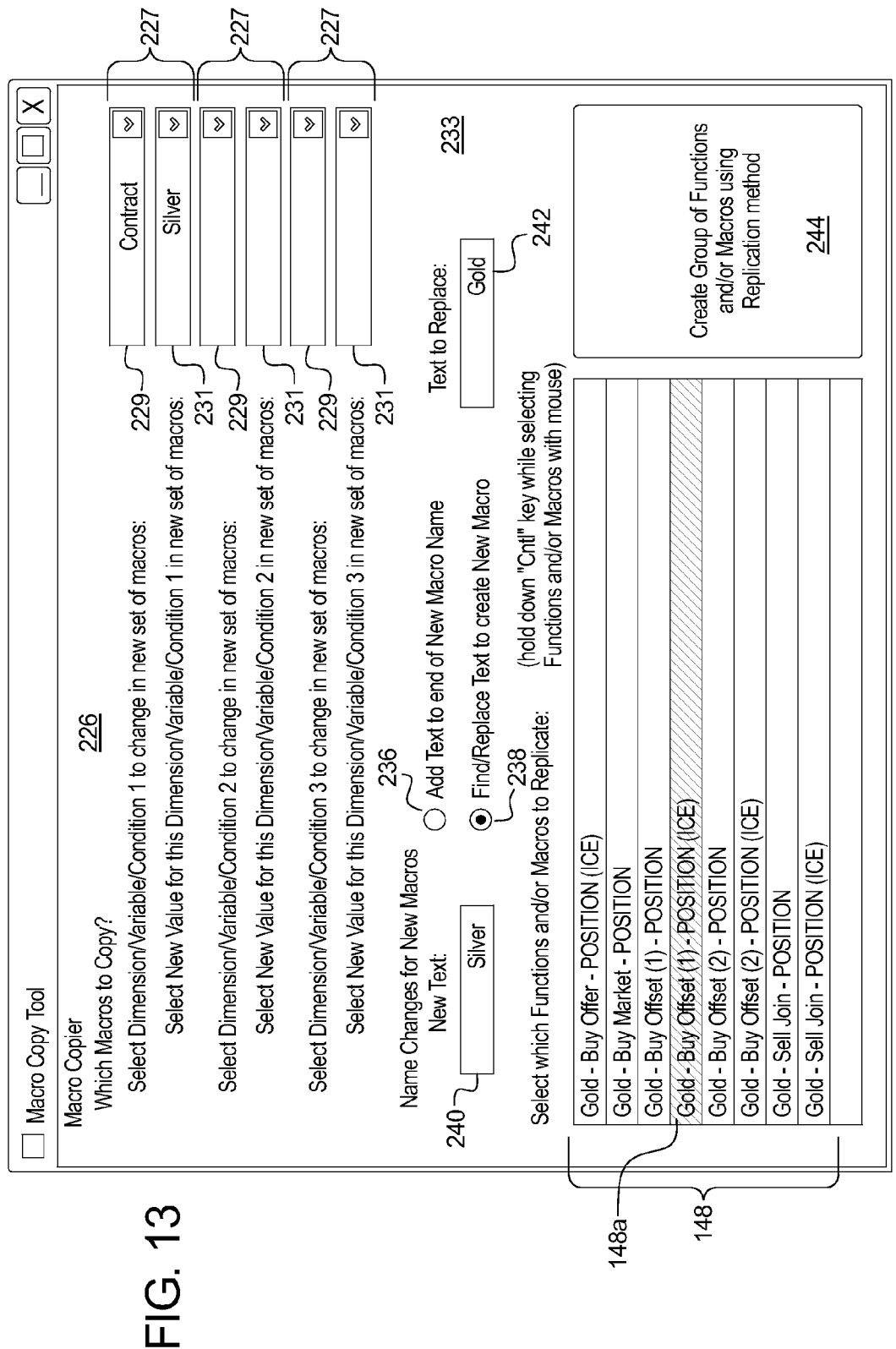
FIG. 13 is another example of a macro copy tool shown in a first state.

Turning now to FIG. 13, another example of a macro copy tool 226 is provided. In the example of the macro copy tool 226 shown in FIG. 13, a list of macros 148 (or functions 168) is provided such that a user may select one or more of the macros 148 for simultaneous editing of one or more variables. Then, using series of variable editing controls 227 (e.g., in this example three sets of variable editing controls 227 are provided), a user may select a variable to edit in all of the selected macros 148 (e.g., contract, order quantity, order type, etc.) using a variable selection control 229 and the value to use for the variable using a value selection control 231. For example, as shown, through the first variable editing control 227, the user may choose to replace the contract (a type of tradable instrument) variable in each of the selected macros 148 with the value silver. Thus, if the selected macro 148a is "Gold—Buy Offset (1)—Position (ICE)" as shown in FIG. 13, the tradable instrument variable in the macro 148 (i.e., gold) will be replaced with the selected value "silver". If multiple macros 148 were selected, the variable editing would occur for all the selected macros 148 simultaneously.

In addition, a name change section 233 is provided through which a user may provide editing commands for the newly copied/edited macros 148. For example, as in the example shown in FIG. 12, the user may be provided with an "add text to new macro name" control 236, a "find/replace text to create new macro" control 238, a "new text" text box 240, a "text to replace" text box 242 and a copy control 244 (i.e., "create group of functions and/or macros using replication method" button).

Figure 14:
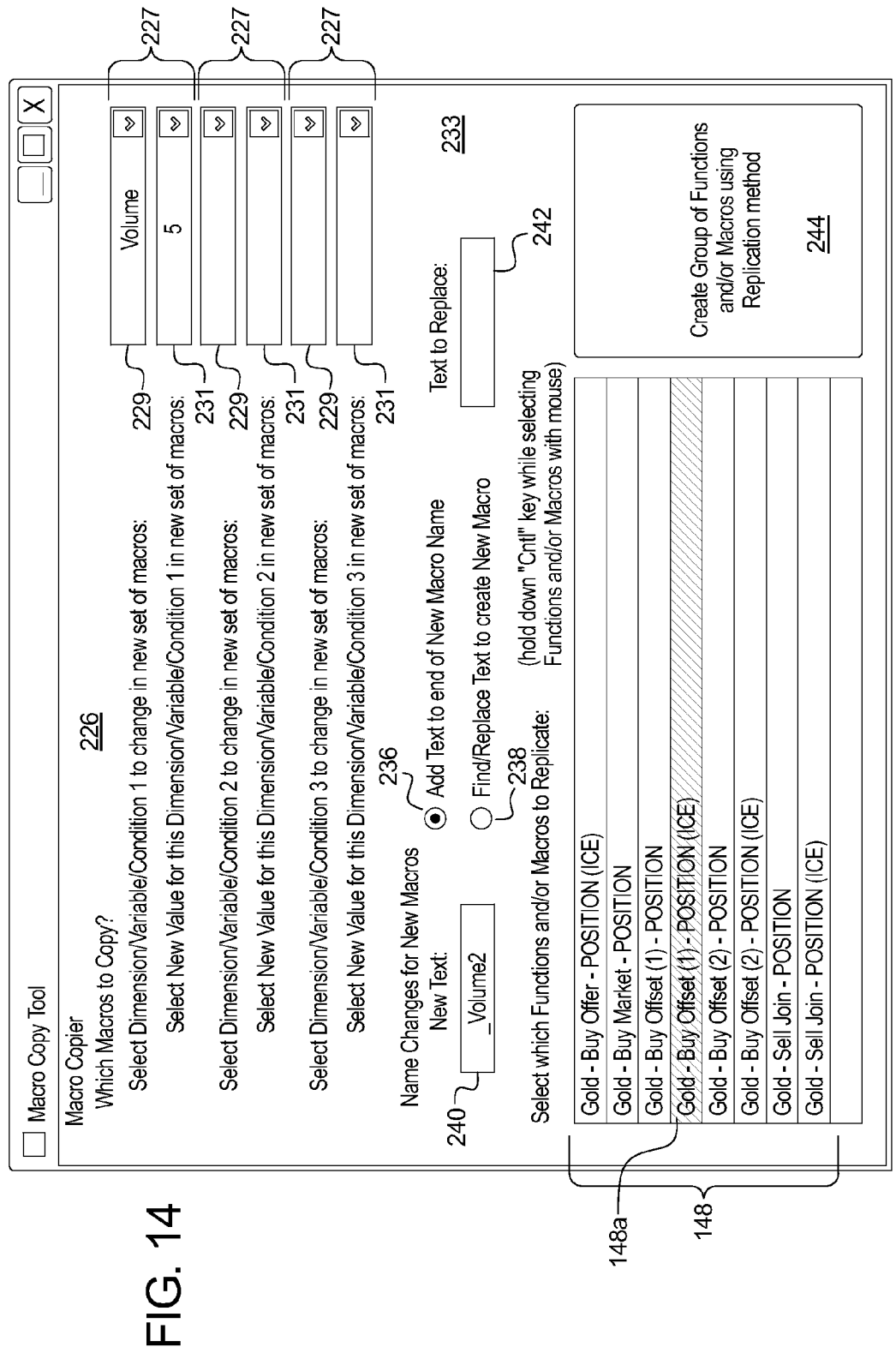
FIG. 14 is the macro copy tool of FIG. 13 shown in a second state.

The macro copy tool 226 shown in FIG. 13 is again shown in FIG. 14, with the only difference in the example shown being that the order quantity variable in the selected macros 148 will be replaced with the selected value "5".

It will be clear from the examples provided that the plurality of variable editing controls 228 may be used in conjunction with each other to make numerous simultaneous edits to each of a plurality of selected macros 148. Such a process enables the user to effect very powerful editing within the macro copy tool 226. As described in the context of the macro copy tool 226 shown in FIG. 12, the macro copy tool 226 shown in FIGS. 13 and 14, as well as other similar macro copy tools 226 may also be modified to edit a group of macros 148 whether or not a new group of macros 148 is created.

The macro copy tool 226 may be used to generate a large list of macros, save the user time, and avoid errors. The benefits many be pronounced if the macro copy tool 226 is applied in an iterative process. In one example, a user starts with 10 macros which each perform the tasks of setting the order quantity to be a quantity of five, and then sending a buy limit order on crude oil futures. The type of limit order varies for each of the 10 macros. In a first iteration of using the macro copy tool 226, all 10 macros are selected in the list of macros 148. The order (buy/sell) is selected using the variable selection control 230 and the value selection control 232 is set to equal "sell". The "find/replace text to create new macro" control 238 is selected, the "text to replace" text box 242 is set to a value of "buy", the "new text" text box 240 is set to a value of "sell", and the copy control 244 is triggered. As a result, 10 new macros are created to give the user a total of 20 macros (10 buy macros, 10 sell macros). In a second step of the example of an iterative process, all 20 macros are selected in the list of macros 148. In this step, the iceberg condition (on/off) is selected using the variable selection control 230 and the value selection control 232 is set to equal "on" (it is assumed that the condition for all 20 existing macros is set to "off"). The "add text to new macro name" control 236 is selected, the "new text" text box 240 is set to a value of "–(Iceberg)", and the copy control 244 is triggered. As a result, 20 new macros are created to give the user a total of 40 macros (10 buy macros without iceberg condition, 10 buy macros with iceberg condition, 10 sell macros without iceberg condition, 10 sell macros with iceberg condition). In a third step of the example of an iterative process, all 40 macros are selected in the list of macros 148. In this step, the tradable instrument is selected using the variable selection control 230 and the value selection control 232 is set to equal "natural gas". After name settings are configured, the copy control 244 is triggered, and as a result, 40 new macros are created to give the user a total of 80 macros (40 macros for crude oil futures, 40 macros for natural gas futures). In a fourth step of the example of an iterative process, all 80 macros are selected in the list of macros 148. In this step, the order quantity amount is selected using the variable selection control 230 and the value selection control 232 is set to equal "maximum sized order". After name settings are configured, the copy control 244 is triggered, and as a result, 80 new macros are created to give the user a total of 160 macros (80 macros with order quantity of five, 80 macros with a maximum sized order quantity).

Even though the iterative example of using the macro copy tool 226 used the macro copy tool 226 for copying macros, it is noted that with only minor modifications to the process, variable values could be edited within a list of macros 148 without creating a new set of macros 148. In one example, if after the user has finished the above steps, it is determined that it is best for the 80 natural gas macros to use an order quantity of three instead of five, the user could then select the 40 pertinent macros for natural gas (note there are 40 other macros for natural gas which apply a maximum order size we can ignore in this example), and using a modified version of the macro copy tool 226 which either/also allows for editing, the user could select the order quantity variable using a variable selection control 230, set the value of a value selection control 232 to three, and then trigger the copy control 244 to edit the value of the order quantity.

Figure 15A:
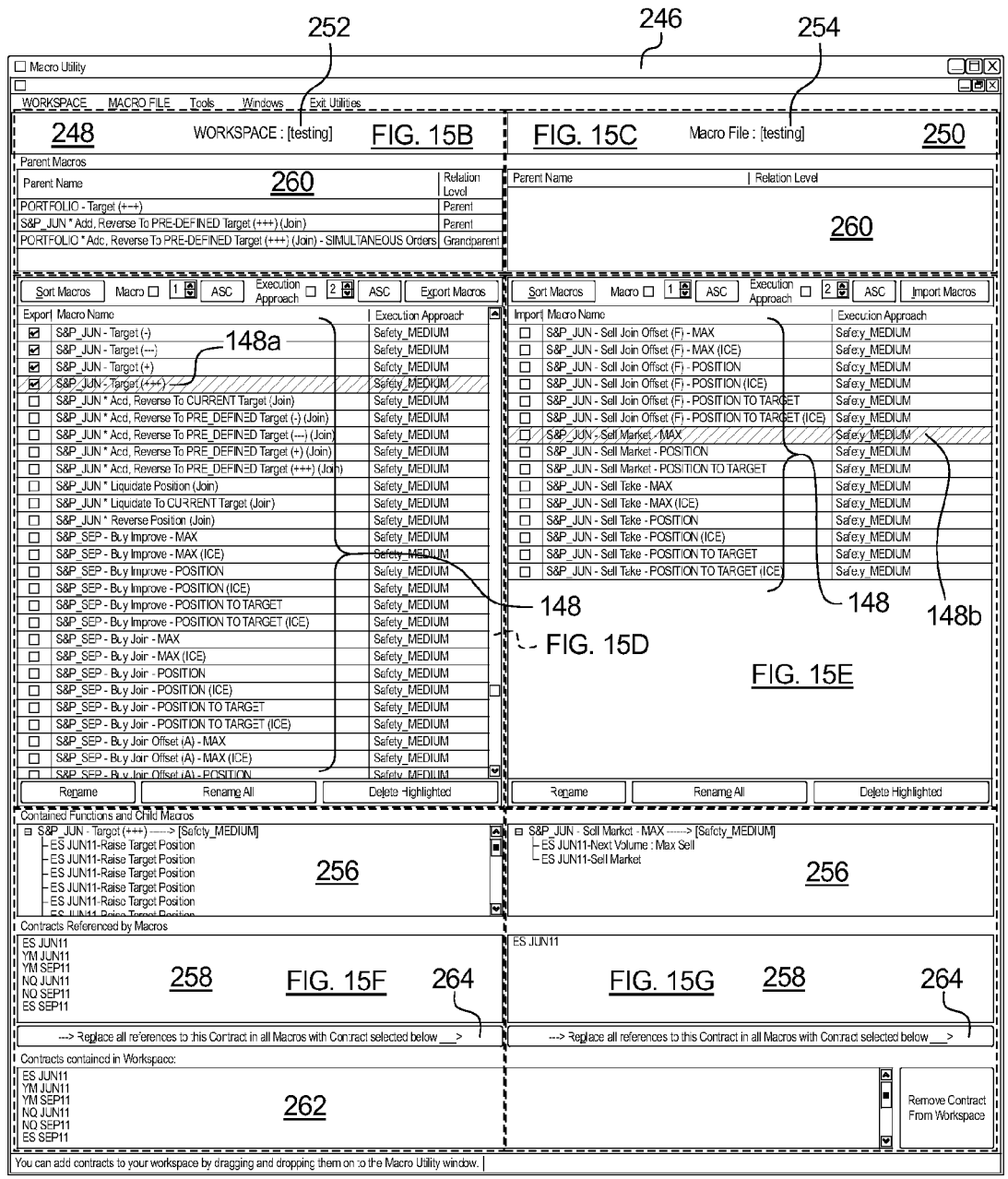

Turning to FIG. 15, a macro utility 246 is shown. The macro utility 246 enables a user to perform many of the management tasks described herein through a single interface. The macro utility 246 shown in this example is divided into a workspace file section 248 and a macro file section 250. The workspace file section 248 allows users to manage macros within a workspace file 252, while the macro file section 250 allows users to manage macros within a macro file 254. The macro file 254 may be any file including macros, such as an import or export file used for transferring macros between workspaces, workstations, users, etc. The workspace file 252 may include data, methods, charts, etc. related to a user's workspace or trading environment. Using the macro utility 246, users may perform any of the macro edit functions, macro copy functions, or other macro management functions discussed herein on macros 148 contained in either the workspace file 252 or the macro file 254. Further, users may also export macros from a workspace file 252 to a macro file 254, and may further import macros from a macro file 254 into a workspace file 252. Because of this simple transferability of macros 148 between the workspace file 252 and macro file 254, macro management functions may be performed rapidly.

As is further seen in FIG. 15, a "contained functions and child macros" section 256, a "contracts referenced by macros" section 258, and a "parent macros" section 260 are each individually associated with both the workspace section 248 and the macro section 250. These sections 256, 258, and 260 offer helpful information to users about the relationships between macros 148 and their contents. This information may be particularly relevant as users perform macro management functions. In the example shown in FIG. 15, a user is able to see that the selected macro 148a within the workspace file section 248 is called by two parents and one grandparent in the parent macros section 260, and is also able to see the functions and other macro calls included within the selected macro 148a shown in the contained functions and child macros section 256. Similarly, a user is able to see that the selected macro 148b within the macro file section 250 does not have any parent macros in the parent macros section 260, and is also able to see two functions calls included within the selected macro 148b shown in the contained functions and child macros section 256. Thus the user is able to make better and faster decisions about the appropriateness of performing the management functions described herein.

Further seen in FIG. 15, a "contracts contained in workspace" section 262 shows the contracts which currently exist in the open workspace file 252. By highlighting one of the tradable instruments in the "contracts referenced by macros" section 258, and by also highlighting one of the tradable instruments in the "contracts contained in workspace" section 262, and then by pressing the "replace all references to this contract in all macros with contract selected below" button 264 in either the workspace file section 248 or the macro file section 250, a user is able to perform an edit of a group of macros 148 to change the tradable instrument referenced.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A trading system comprising:
   a first set of two or more functions and a second set of two or more functions, wherein each of the functions in the first set and the second set reference a tradeable instrument, wherein the tradeable instrument in the first set of functions and the tradeable instrument in the second set of functions are different at a given point in time; and
   a user interface including a function editing mechanism through which a user edits the tradeable instrument referenced by each of the functions in the first set of functions without affecting the tradeable instrument referenced by value of the variable that is of the common variable type in the second set of functions.

2. The trading system of claim 1 wherein at least a first function from the first set of functions and at least a second function from the second set of functions are executed sequentially.

3. The trading system of claim 2 wherein the first function and second function are executed sequentially without any intermediate process between a first trigger for executing the first function and a second trigger for executing the second function.

4. The trading system of claim 3 wherein the first trigger and the second trigger are user-directed.

5. The trading system of claim 3 wherein the intermediate process is a user-selection occurring between the first trigger for executing the first function and the second trigger for executing the second function.

6. The trading system of claim 5 wherein the user-selection is a mouse click.

7. The trading system of claim 5 wherein the user-selection is a key press.

8. The trading system of claim 1 wherein the function editing mechanism further enables a user-selected set of functions to be created.

9. The trading system of claim 1 wherein, when the editing occurs, no market action is taken.

10. The trading system of claim 1 wherein the functions are macros.

11. A method of managing sets of functions in a trading system comprising the steps of:
    within a trading system, providing a first set of two or more functions and a second set of two or more functions, wherein each of the functions in the first set and the second set reference a tradeable instrument, wherein the tradeable instrument referenced in the first set of functions and the tradeable instrument referenced in the second set of functions are different at a given point in time;
    providing a function editing mechanism through which the tradeable instrument referenced in the first set of functions are edited for each of the functions in the first set of functions without affecting the tradeable instrument referenced in the second set of functions;
    receiving a user command to edit the tradeable instrument referenced in the first set of functions for each of the functions in the first set of functions without affecting the tradeable instrument referenced in the second set of functions; and
    in response to the user command, editing the tradeable instrument referenced in the first set of functions for each of the functions in the first set of functions without affecting the tradeable instrument referenced in the second set of functions.

12. The method of claim 11 wherein at least a first function from the first set of functions and at least a second function from the second set of functions are executed sequentially.

13. The method of claim 12 wherein the first function and second function are executed sequentially without any intermediate process between a first trigger for executing the first function and a second trigger for executing the second function.

14. The trading system of claim 13 wherein the first trigger and the second trigger are user-actions.

15. The trading system of claim 13 wherein the intermediate process is a user-selection occurring between the first trigger for executing the first function and the second trigger for executing the second function.

16. The trading system of claim 15 wherein the user-selection is a mouse click.

17. The trading system of claim 15 wherein the user-selection is a key press.

18. The trading system of claim 11 wherein the function editing mechanism further enables a user-selected set of functions to be created.

19. The method of claim 11 wherein, when the editing occurs, no market action is taken.

20. The method of claim 11 wherein the functions are macros.

\* \* \* \* \*